United States Patent
Hata et al.

(10) Patent No.: US 6,610,815 B1
(45) Date of Patent: Aug. 26, 2003

(54) POLYAMIC ACID ESTER

(75) Inventors: Keiko Hata, Machida (JP); Yoko Tanizaki, Fuji (JP); Yoshio Matsuoka, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 09/868,782

(22) PCT Filed: Jan. 21, 2000

(86) PCT No.: PCT/JP00/00302

§ 371 (c)(1), (2), (4) Date: Jun. 21, 2001

(87) PCT Pub. No.: WO00/43439

PCT Pub. Date: Jul. 27, 2000

(30) Foreign Application Priority Data

Jan. 21, 1999 (JP) .............................................. 11-013419

(51) Int. Cl.$^7$ ............................ C08G 73/10; G03C 1/73
(52) U.S. Cl. ......................... 528/310; 528/170; 528/172; 528/173; 528/174; 528/188; 528/189; 528/272; 528/353; 522/164; 430/283.1; 430/325; 430/326; 525/420
(58) Field of Search .............................. 430/283.1, 325, 430/326; 528/149, 183, 185, 172, 353, 310, 170, 242, 174, 188, 189; 522/164; 525/420

(56) References Cited

U.S. PATENT DOCUMENTS

| | | | |
|---|---|---|---|
| 4,243,743 A | 1/1981 | Hiramoto et al. | 430/281 |
| 4,551,522 A | 11/1985 | Fryd et al. | 528/351 |
| 4,590,258 A | 5/1986 | Linde et al. | 528/189 |
| 4,954,578 A | 9/1990 | Ree et al. | 525/432 |
| 5,310,862 A * | 5/1994 | Nomura et al. | 528/353 |
| 5,847,071 A * | 12/1998 | Hagiwara et al. | 528/353 |
| 6,319,656 B1 * | 11/2001 | Kikkawa et al. | 430/325 |
| 6,365,306 B1 * | 4/2002 | Nunomura et al. | 430/18 |
| 6,482,569 B1 * | 11/2002 | Matsuoka et al. | 430/283.1 |

FOREIGN PATENT DOCUMENTS

| | | |
|---|---|---|
| EP | 0 251 347 A1 | 1/1988 |
| JP | 63-318549 A | 12/1988 |

OTHER PUBLICATIONS

Yamaoka et al., "Pori fairu (Polyfile)", vol. 27, No. 2, p. 14–18, (1990).

Li et al., "Preparation of Negative Photoreactive Polyimide and Its Characterization", vol. 44, No. 8, p. 1365–1370, (1992).

* cited by examiner

Primary Examiner—P. Hampton-Hightower
(74) Attorney, Agent, or Firm—Birch, Stewart, Kolasch & Birch, LLP

(57) ABSTRACT

Disclosed is a polyamide ester which comprises a plurality of specific amide ester recurring units including, in a specific ratio, recurring units containing a tetravalent benzene group and recurring units containing a tetravalent diphenyl ether group, and which is adapted to be converted to a polyimide in a coating form by heat-curing, wherein the polyimide coating exhibits a residual stress of 33 MPa or less as measured with respect to a 10 μm-thick polyimide coating formed on a silicon substrate. Also disclosed is a polyamide ester composition comprising a plurality of different polyamide esters, wherein the plurality of different polyamide esters collectively contain, in a specific ratio, the recurring units containing a tetravalent benzene group and the recurring units containing a tetravalent diphenyl ether group.

12 Claims, 1 Drawing Sheet

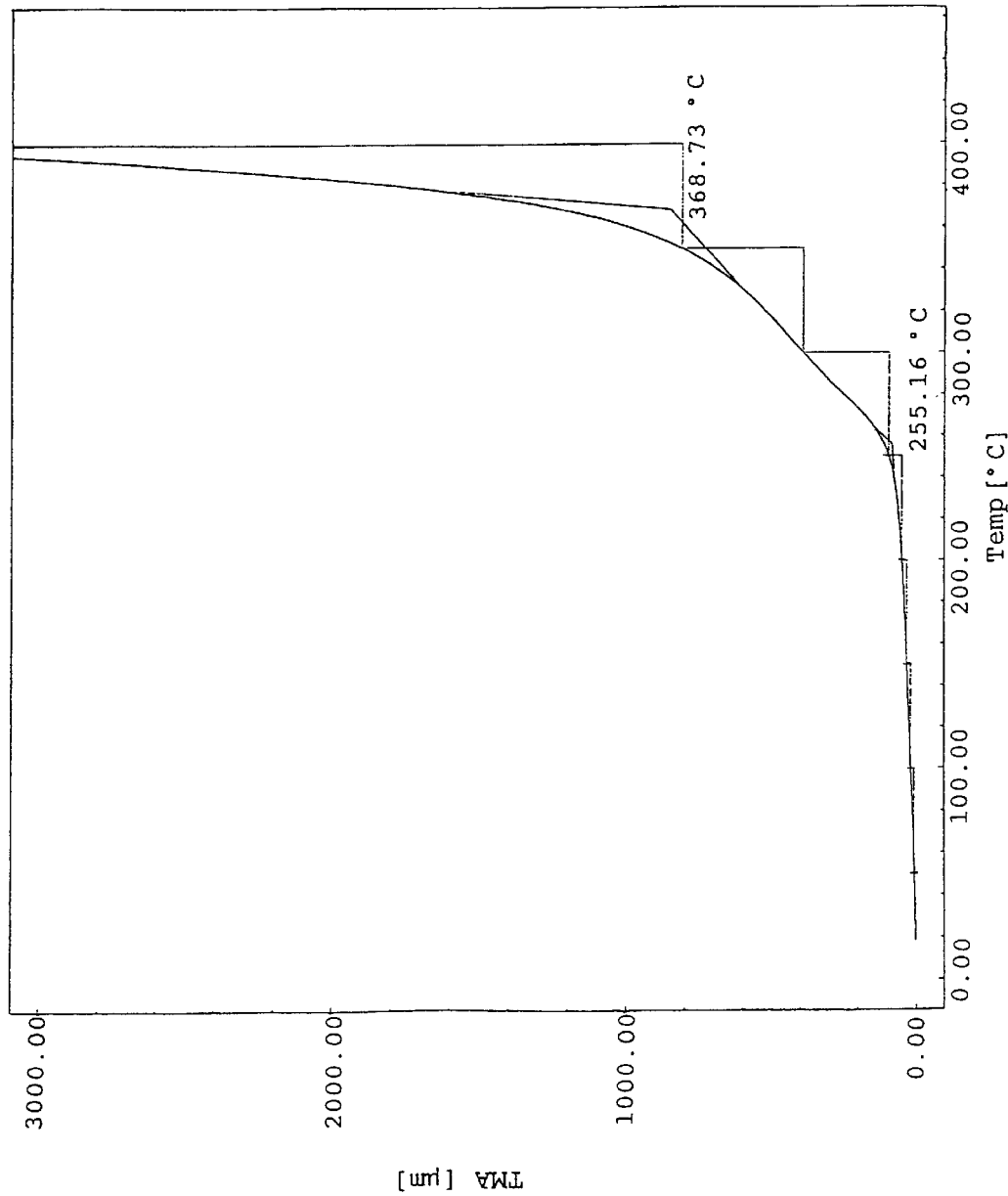

POLYAMIC ACID ESTER

This application is the national phase under 35 U.S.C. § 371 of PCT International Application No. PCT/JP00/00302, which has an International filing date of Jan. 21, 2000, which designated the United States of America and was not published in English.

BACKGROUND OF THE INVENTION

1. Field of the Invention

The present invention relates to a polyamide ester. More particularly, the present invention is concerned with a polyamide ester which comprises a plurality of specific amide ester recurring units including, in a specific ratio, recurring units containing a tetravalent benzene group and recurring units containing a tetravalent diphenyl ether group, and which is adapted to be converted to a polyimide in a coating form by heat-curing, wherein the polyimide coating exhibits a residual stress of 33 MPa or less as measured with respect to a 10 μm-thick polyimide coating formed on a silicon substrate. By the use of the polyamide ester of the present invention, it has become possible to prepare a photosensitive composition having excellent storage stability, wherein, for example, the change in viscosity of the composition during the storage thereof is suppressed. Further, the use of such a photosensitive composition enables not only the formation of a polyimide coating which simultaneously exhibits a low residual stress, a high chemical resistance, a high heat resistance and a high adhesiveness to a substrate, but also the formation of a polyimide pattern with a high resolution and a high precision. Therefore, the polyamide ester of the present invention can be advantageously used in the production of electric or electronic parts, such as a semiconductor device and a multilayer circuit board. Further, the present invention is also concerned with a polyamide ester composition having the same excellent effects as mentioned above in connection with the polyamide ester of the present invention.

2. Prior Art

Polyimide resins have excellent thermal and chemical stabilities, a low dielectric constant and a planation or planarization ability. Therefore, polyimide resins have been drawing attention as materials for use in fields related to microelectronics and, in fact, have been widely used as a material for a surface-protective film for a semiconductor, a material for an insulator layer used in a multilayer circuit structure, a material for a multichip module, and the like.

Generally, in the process for forming a polyimide resin coating in a desired pattern on a semiconductor device, a polyimide resin coating is first formed on a substrate and then, a desired pattern is formed on the polyimide resin coating by a lithographic technique. In this case, the desired pattern is formed through an indirect procedure. Specifically, a polyimide resin pattern is formed by a process in which a photoresist pattern (corresponding to a desired polyimide resin pattern) is formed on a polyimide resin coating using a photoresist and a photomask, followed by etching to obtain a polyimide resin pattern. This process has problems in that it requires complicated operations (wherein a photoresist pattern serving as a mask for a subsequent etching operation is first formed on a polyimide resin coating and, then, the polyimide resin is etched, and, finally, the photoresist pattern, which no longer is necessary, is removed), and that, since the desired pattern is formed through an indirect procedure, the resolution is low. In addition, this process has a problem of safety, since this process requires the use of a poisonous substance, such as hydrazine, as a solvent for etching.

In recent years, for solving the above-mentioned problems, studies have been made on a method using a polyimide precursor containing a photopolymerizable photosensitive group. In this method a desired pattern is directly formed in a polyimide precursor coating. For example, there has been proposed a method which comprises: forming on a substrate a coating of a photosensitive composition (comprising a polyimide precursor composed of a polyamide acid derivative having bonded thereto a double bond-containing compound through an ester linkage, an amide linkage, an ionic linkage or the like, and a photoinitiator); exposing the coating through a photomask (having an image corresponding to a desired pattern), so that the polyimide precursor present in the exposed area of the coating becomes insoluble to a developer, thereby forming a latent pattern image in the coating; subjecting the resultant coating to a developing treatment, thereby obtaining a desired pattern of the polyimide precursor; and heating the obtained pattern to remove photosensitive group-containing components (such as the above-mentioned double bond-containing compound and the photoinitiator), thereby converting the polyimide precursor to a polyimide having heat stability (Yamaoka and Omote, "Pori fairu (Polyfile)", Vol. 27, No. 2, pages 14 to 18, 1990). This method is generally called a photosensitive polyimide technique. By this technique, the above-mentioned problems accompanying the conventional processes using a non-photosensitive polyimide have been overcome. Therefore, the above-mentioned photosensitive polyimide technique has been put into wide use in the formation of a polyimide pattern.

However, in recent years, demands for higher resolution in the formation of a polyimide pattern used in a semiconductor device and the like have increased. In the processes using a non-photosensitive polyimide (which were developed prior to the development of the above-mentioned photosensitive polyimide technique), the resolution is low, and such low resolution is taken into consideration when the semiconductor devices per se and the production processes for semiconductor devices are designed. Therefore, the degree of circuit integration of the semiconductor devices and the precision of the semiconductor devices are necessarily low. On the other hand, by the use of the photosensitive polyimide, it is possible to achieve a high resolution in the formation of a polyimide pattern and, hence, semiconductor devices having a high degree of circuit integration and a high precision can be produced. On this point, an explanation is made below. For example, in the production of a memory device etc., in order to increase productivity, commonly employable circuits are first formed and, after examination of the memory device etc., unnecessary circuit portions are cut-off. In conventional processes using a non-photosensitive polyimide, this cutting step is conducted before forming the polyimide patterns. On the other hand, in the processes using a photosensitive polyimide, it has become possible to obtain high resolution patterning of the polyimide. Therefore, in forming polyimide patterns on circuits, appropriate holes are first formed in the polyimide pattern film, so that cutting of unnecessary circuit portions can be performed through the holes after the formation of the polyimide pattern film. The cutting-off of unnecessary circuit portions after forming polyimide patterns enables the yield of products to be improved, since the timing of the cutting-off of the unnecessary circuit portions is close to the completion of the final products, as compared to the case of the conventional processes using a non-photosensitive polyimide.

In the above-mentioned process in which the cutting of unnecessary circuit portions is performed through the holes after the formation of polyimide patterns, it is desired that the holes be as small as possible so as to achieve a high degree of circuit integration of the device. Accordingly, the demand for photosensitive polyimide precursors capable of forming a pattern with an improved resolution has increased. When such a photosensitive polyimide precursor is used, it becomes possible to achieve a wide process margin which is necessary for efficiently producing a semiconductor device having a high degree of circuit integration and a high precision. (A process having a "wide process margin" means a process in which the employable ranges of conditions (e.g., time and temperature) for the exposure and the development in the formation of a pattern are wide.) Therefore, the higher the resolution in the formation of a polyimide pattern, the more desirable the photosensitive polyimide precursor. This applies to the case of polyimide patterns used in other devices, such as a multichip module. Therefore, there has been an increasing demand for a photosensitive polyimide precursor composition capable of forming a polyimide pattern with a high resolution and a high precision.

Since the required polyimide coatings tend to be thick and the required printed circuits tend to be more dense, the demand for high resolution photosensitive polyimide precursor compositions is high.

Further, when a polyimide coating has a poor heat resistance, such a coating is deteriorated during the heat-curing in the formation of a pattern. For this reason, the heat resistance of a polyimide film is also important.

In recent years, there has been a marked trend to increase the diameter of a silicon wafer (substrate) used in the production of a semiconductor device so as to improve the production efficiency. When a polyimide is used for forming a surface protective-coating for a semiconductor device, a stress is generated at the interface between the substrate and the polyimide coating due to the difference in the degree of shrinkage (caused when a polyimide coating formed on a substrate by heat-curing is cooled to room temperature) between the substrate and the polyimide coating. This stress causes warpage of the substrate. The larger the diameter of the substrate, the larger the warpage. When the warpage of the substrate is large, disadvantages are likely to be caused such that efficiency of the production process is adversely affected and that the cracking of the polyimide coating occurs. Therefore, it has been desired to develop a polyimide precursor capable of forming a polyimide coating having a satisfactorily small residual stress.

Further, when it is intended to use a polyimide to form a surface protective coating for a semiconductor device, it is required that the polyimide coating exhibit a high adhesiveness to a substrate, and that the adhesion of the polyimide coating to the substrate has a high water resistance (these required properties are hereinafter, collectively referred to as "water resistant adhesion").

Further, a polyimide coating is expected to have high mechanical properties, especially, a high elongation. The production process for semiconductor devices involves a step in which a polyimide coating is exposed to a high temperature (400° C. or more) and hence, a polyimide coating is required to have a high heat resistance such that the change in properties of the coating, such as mechanical properties (e.g., elongation), can be prevented even under high temperature conditions. The polyimide coating is also required to have a high chemical resistance.

It has been desired to develop a photosensitive polyimide precursor which can be used for forming a polyimide pattern having all of the above-mentioned required properties. However, as explained below, such an excellent photosensitive polyimide precursor has conventionally not been realized.

Conventionally, a tetracarboxylic acid dianhydride and a diamine are usually used as monomers for producing a polyimide. Since a homopolyimide having all of the above-mentioned required properties has not been obtained, a number of proposals have been made on various combinations of monomers for synthesizing an excellent polyimide. For example, with respect to the non-photosensitive polyimide and the non-photosensitive polyimide precursor, Unexamined Japanese Patent Application Laid-Open Specification No. 60-147441 (corresponding to U.S. Pat. No. 4,590,258 and EP154720B1) describes a technique for producing a polyamide acid, in which pyromellitic acid anhydride (PMDA), and oxydiphthalic acid anhydride (ODPA) or benzophenone tetracarboxylic acid are used as tetracarboxylic acid dianhydrides, and these tetracarboxylic acid dianhydrides are reacted with oxydianiline. Further, this prior art document also describes a polyimide obtained by imidizing the above-mentioned polyamide acid. However, the polyimide obtained from ODPA has a problem in heat resistance. It is known that the heat resistance of a polyimide in a copolymer form obtained by copolymerizing ODPA and PMDA is lowered almost linearly as the content of ODPA in the obtained polyimide is increased. This is apparent from the data of the weight loss test conducted at 500° C. for 1 hour, which are shown in Table 2 of the above prior art document.

As an example of the photosensitive polyimide technique, there can be mentioned methods in which a photosensitive polyimide precursor is obtained through a polyamide acid. Specific examples of such methods include a method disclosed in Examined Japanese Patent Application Publication No. 59-52822 (corresponding to U.S. Pat. No. 4,243,743), in which a photosensitive polyamide acid is obtained by introducing a photosensitive group to a polyamide acid through an ionic linkage, and a method disclosed in Examined Japanese Patent Application Publication No. 4-623062 (corresponding to U.S. Pat. No. 4,551,522 and EP203372B1), in which a polyamide acid is converted to a polyisoimide, and the obtained polyisoimide is reacted with an alcohol to obtain a photosensitive polyamide ester. However, as in the case of the above-mentioned non-photosensitive polyimide, a photosensitive homopolymer form of a polyamide acid or polyamide ester cannot be used as a photosensitive polyimide precursor for obtaining a polyimide having all of the above-mentioned required properties. Further, as in the case of the above-mentioned polyamide acid in a copolymer form obtained by copolymerizing ODPA and PMDA, even when a copolymer obtained by introducing a photosensitive group to a copolymer of a plurality of different tetracarboxylic acid dianhydrides is used as a polyimide precursor, it is impossible to produce a polyimide pattern having all of the above-mentioned required properties. This is because all of the different tetracarboxylic acid dianhydrides have their respective different defects, and a defect of a certain tetracarboxylic acid dianhydride cannot be compensated by the use of other tetracarboxylic acid dianhydrides. Specifically, a polyimide produced from ODPA has problems, such as a low heat resistance which leads to a lowering of the pattern precision caused during the heat-curing, a low chemical resistance, and a high residual stress. On the other hand, a polyimide produced from PMDA has problems different from those of the polyimide obtained from ODPA, i.e., a low water resistant adhesiveness, a low elongation and the like. Conventionally, there has been no polyimide which is free from all of these problems.

Unexamined Japanese Patent Application Laid-Open Specification No. 2-135274 (corresponding to U.S. Pat. No. 4,954,578 and EP366307B1) proposes a method in which a mixture of solutions of two different polyimides which are incompatible with each other is used to form a polyimide coating having a microstructure in which the microdomains of the two different polyimides are present and the size of each microdomain is 1 µm or less. In this method, such a microstructure is formed in an attempt to obtain a polyimide coating having the respective properties of both of the two different polyimides. However, when this method is applied to the photosensitive polyimide technique, the following problem arises. When a mixture of solutions of two different photosensitive polyimide precursors which are incompatible with each other is used to form a photosensitive polyimide precursor coating, such a photosensitive polyimide precursor coating contains respective domains of the polyimide precursors, wherein each domain has a size which is a little smaller than or larger than the wavelength of light. Therefore, light is diffused in the coating, leading to a lowering of the pattern precision and the resolution.

SUMMARY OF THE INVENTION

In this situation, the present inventors have made extensive and intensive studies with a view toward developing a photosensitive polyimide precursor which can be advantageously used for forming a polyimide pattern which simultaneously exhibits a low residual stress, a high water resistant adhesion, a high elongation, a high chemical resistance, a high heat resistance and a high precision. As a result, it has unexpectedly been found that a specific polyamide ester obtained from tetracarboxylic acid dianhydrides including a tetravalent diphenyl ether group-containing tetracarboxylic acid dianhydride (such as ODPA) and a tetravalent benzene group-containing tetracarboxylic acid dianhydride (such as PMDA) exhibits only the respective advantageous effects of the above two different tetracarboxylic acid dianhydrides, and such a specific polyamide ester can be used as an excellent photosensitive polyimide precursor. The above-mentioned specific polyamide ester comprises recurring units derived from a tetravalent diphenyl ether group-containing tetracarboxylic acid dianhydride (such as ODPA) (which, when used in conventional processes for producing a polyimide, has an effect of improving the water resistant adhesion and the elongation of a polyimide but has a defect of lowering the heat resistance of a polyimide), and recurring units derived from a tetravalent benzene group-containing tetracarboxylic acid dianhydride (such as PMDA) (which, when used in conventional processes for producing a polyimide, has an effect of improving the heat resistance and the chemical resistance of a polyimide and an advantageous effect of lowering the coefficient of thermal expansion but has a defect of lowering the water resistant adhesion and the elongation of a polyimide) in specific molar ratios, relative to the total molar amount of the recurring units, which polyamide ester is adapted to be converted to a polyimide in a coating form by heat-curing, wherein the polyimide coating exhibits a residual stress as low as 33 MPa or less as measured with respect to a 10 µm-thick polyimide coating formed on a silicon substrate. Further, it has also been found that a polyamide ester composition comprising a plurality of different polyamide esters, wherein the plurality of different polyamide esters collectively contain recurring units derived from the above-mentioned tetravalent diphenyl ether group-containing tetracarboxylic acid dianhydride and recurring units derived from the above-mentioned tetravalent benzene group-containing tetracarboxylic acid dianhydride in specific molar ratios, relative to the total molar amount of the recurring units of the different polyamide esters, can also be used as a polyimide precursor having the same excellent effects as mentioned above in connection with the specific polyamide ester. The present invention has been completed, based on these novel findings.

Accordingly, it is a primary object of the present invention to provide a polyamide ester which can also be advantageously used for obtaining a photosensitive composition capable of forming a polyimide pattern which simultaneously exhibits a low residual stress, a high water resistant adhesion, a high elongation, a high chemical resistance, a high heat resistance and a high precision.

Another object of the present invention is to provide a polyamide ester composition which can be advantageously used for obtaining the above-mentioned excellent photosensitive composition.

Still a further object of the present invention is to provide a photosensitive composition having excellent effects as mentioned above.

The foregoing and other objects, features and advantages of the present invention will be apparent from the following detailed description and claims taken in connection with the accompanying drawing.

BRIEF DESCRIPTION OF THE DRAWINGS

In the accompanying drawing:

FIG. 1 is a graph showing the results of the thermal mechanical analysis (TMA) conducted in Reference Example 1 with respect to a polyimide tape produced in Reference Example 1 from a polyamide ester produced in Example 3, wherein the thermal mechanical analysis was repeated twice in order to confirm the reproducibility of the analysis.

DETAILED DESCRIPTION OF THE INVENTION

According to the present invention, there is provided a polyamide ester comprising recurring units represented by the following formula (I):

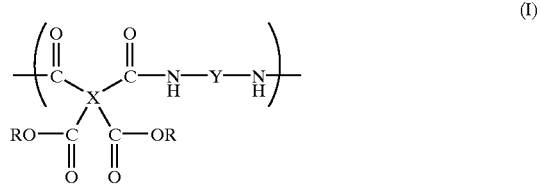

wherein:
  each X independently represents a tetravalent aromatic group having 6 to 32 carbon atoms,
  each Y independently represents a divalent organic group having 4 to 30 carbon atoms, and
  each R independently represents a monovalent group containing an olefinic double bond,
  the tetravalent aromatic groups X comprising:
    15 to 70 mole %, based on the total molar amount of the tetravalent aromatic groups X, of a tetravalent benzene group (II) represented by the following formula (II):

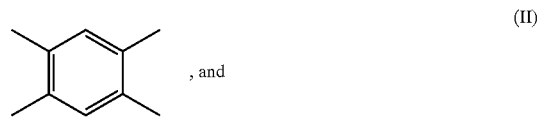

, and 15 to 50 mole %, based on the total molar amount of the tetravalent aromatic groups X, of a tetravalent diphe nyl ether group (III) represented by the following formula (III):

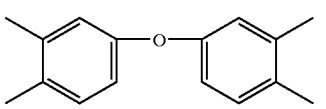  (III)

with the proviso that the total amount of the tetravalent benzene group (II) and the tetravalent diphenyl ether group (III) is at least 50 mole %, based on the total molar amount of the tetravalent aromatic groups X, the polyamide ester being adapted to be converted to a polyimide in a coating form when a solution of the polyamide ester in a solvent for the polyamide ester is applied onto a silicon substrate to form a polyamide ester coating and heated at 350° C. for 2 hours in a nitrogen atmosphere, the polyimide coating exhibiting a residual stress of 33 MPa or less as measured with respect to a 10 μm-thick polyimide coating formed on the silicon substrate.

For easy understanding of the present invention, the essential features and various preferred embodiments of the present invention are enumerated below.

1. A polyamide ester comprising recurring units represented by the following formula (I):

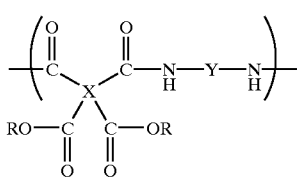  (I)

wherein:
each X independently represents a tetravalent aromatic group having 6 to 32 carbon atoms,
each Y independently represents a divalent organic group having 4 to 30 carbon atoms, and
each R independently represents a monovalent group containing an olefinic double bond, the tetravalent aromatic groups X comprising:
15 to 70 mole %, based on the total molar amount of the tetravalent aromatic groups X, of a tetravalent benzene group (II) represented by the following formula (II):

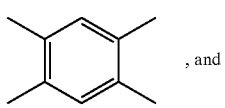, and  (II)

15 to 50 mole %, based on the total molar amount of the tetravalent aromatic groups X, of a tetravalent diphenyl ether group (III) represented by the following formula (III):

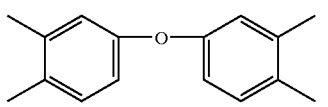,  (III)

with the proviso that the total amount of the tetravalent benzene group (II) and the tetravalent diphenyl ether group (III) is at least 50 mole %, based on the total molar amount of the tetravalent aromatic groups X, the polyamide ester being adapted to be converted to a polyimide in a coating form when a solution of the polyamide ester in a solvent for the polyamide ester is applied onto a silicon substrate to form a polyamide ester coating and heated at 350° C. for 2 hours in a nitrogen atmosphere, the polyimide coating exhibiting a residual stress of 33 MPa or less as measured with respect to a 10 μm-thick polyimide coating formed on the silicon substrate.

2. The polyamide ester according to item 1 above, wherein the amount of the tetravalent diphenyl ether group (III) is 30 to 45 mole %, based on the total molar amount of the tetravalent aromatic groups X.

3. The polyamide ester according to item 1 or 2 above, which is produced by a process comprising subjecting a tetracarboxylic acid diester dioxychloride mixture and a diamine to a condensation polymerization reaction in the presence of a basic compound, wherein the basic compound is used in an amount of not more than 0.5 equivalent per equivalent of acid by-produced during the condensation polymerization reaction, the tetracarboxylic acid diester dioxychloride mixture comprising a plurality of different tetracarboxylic acid diester dioxychlorides, each independently represented by the following formula (I'):

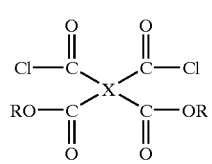  (I')

wherein:
X represents a tetravalent aromatic group having 6 to 32 carbon atoms,
R represents a monovalent group containing an olefinic double bond, and
Cl represents a chlorine atom, the plurality of different tetracarboxylic acid diester dioxychlorides comprising:
15 to 70 mole %, based on the total molar amount of the plurality of different tetracarboxylic acid diester dioxychlorides, of a tetracarboxylic acid diester dioxychloride represented by the formula (I') wherein the tetravalent aromatic group X is a tetravalent benzene group (II) represented by the following formula (II):

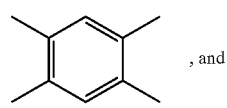, and  (II)

15 to 50 mole %, based on the total molar amount of the plurality of different tetracarboxylic acid diester dioxychlorides, of a tetracarboxylic acid diester dioxychloride represented by formula (I') wherein the tetravalent aromatic group X is a tetravalent diphenyl ether group (III) represented by the following formula (III):

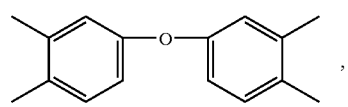,  (III)

with the proviso that the total amount of the tetracarboxylic acid diester dioxychloride containing the tetravalent benzene group (II) and the tetracarboxylic acid diester dioxychloride containing the tetravalent diphenyl ether group (III) is at least 50 mole %, based on the total molar amount of the plurality of different tetracarboxylic acid diester dioxychlorides.

4. The polyamide ester according to item 1 or 2 above, which is produced by a process comprising subjecting a tetracarboxylic acid diester mixture and a diamine to a condensation polymerization reaction in the presence of an organic dehydrating agent, the tetracarboxylic acid diester mixture comprising a plurality of different tetracarboxylic acid diesters, each independently represented by the following formula (I"):

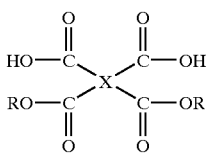
(I")

wherein:
X represents a tetravalent aromatic group having 6 to 32 carbon atoms; and
R represents a monovalent group containing an olefinic double bond, the plurality of different tetracarboxylic acid diesters comprising:
15 to 70 mole %, based on the total molar amount of the plurality of different tetracarboxylic acid diesters, of a tetracarboxylic acid diester represented by the formula (I") wherein the tetravalent aromatic group X is a tetravalent benzene group (II) represented by the following formula (II):

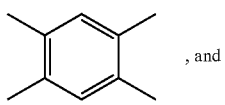
, and
(II)

15 to 50 mole %, based on the total molar amount of the plurality of different tetracarboxylic acid diesters, of a tetracarboxylic acid diester represented by the formula (I") wherein the tetravalent aromatic group X is a tetravalent diphenyl ether group (III) represented by the following formula (III):

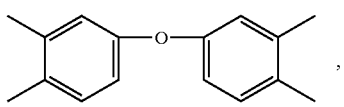
,
(III)

with the proviso that the total amount of the tetracarboxylic acid diester containing the tetravalent benzene group (II) and the tetracarboxylic acid diester containing the tetravalent diphenyl ether group (III) is at least 50 mole %, based on the total molar amount of the plurality of different tetracarboxylic acid diesters.

5. The polyamide ester according to item 4 above, wherein the tetracarboxylic acid diester mixture is produced by reacting a mixture of different tetracarboxylic acid dianhydrides having tetravalent aromatic groups X corresponding to the tetravalent aromatic groups X of the plurality of different tetracarboxylic acid diesters with an alcohol, wherein the alcohol is used in an amount of 1.01 to 1.10 equivalents per equivalent of the mixture of different tetracarboxylic acid dianhydrides.

6. The polyamide ester according to item 4 above, wherein the organic dehydrating agent is used in an amount of 0.90 to 0.99 equivalent per equivalent of the tetracarboxylic acid diester mixture.

7. A polyamide ester composition comprising a plurality of different polyamide esters, each independently comprising recurring units represented by the following formula (I):

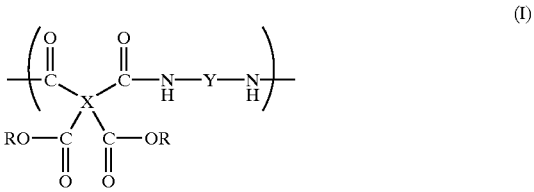
(I)

wherein:
each X independently represents a tetravalent aromatic group having 6 to 32 carbon atoms,
each Y independently represents a divalent organic group having 4 to 30 carbon atoms, and
each R independently represents a monovalent group containing an olefinic double bond, the plurality of different polyamide esters collectively containing, as the tetravalent aromatic groups X, the following two types of groups:
15 to 70 mole %, based on the total molar amount of the tetravalent aromatic groups X, of a tetravalent benzene group (II) represented by the following formula (II):

, and
(II)

15 to 50 mole %, based on the total molar amount of the tetravalent aromatic groups X, of a tetravalent diphenyl ether group (III) represented by the following formula (III):

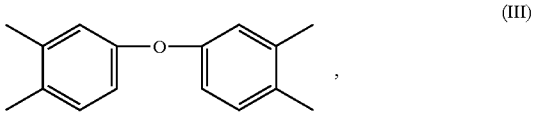
,
(III)

with the proviso that the total amount of the tetravalent benzene group (II) and the tetravalent diphenyl ether group (III) is at least 50 mole %, based on the total molar amount of the tetravalent aromatic groups X, the polyamide ester composition being adapted to be converted to a polyimide composition in a coating form when a solution of the polyamide ester composition in a solvent for the polyamide ester composition is applied onto a silicon substrate to form a polyamide ester composition coating and heated at 350° C. for 2 hours in a nitrogen atmosphere, the polyimide composition coating exhibiting a residual stress of 33 MPa or less as measured with respect to a 10 μm-thick polyimide composition coating formed on the silicon substrate.

8. The polyamide ester composition according to item 7 above, wherein the amount of the tetravalent diphenyl ether group (III) is 30 to 45 mole %, based on the total molar amount of the tetravalent aromatic groups X.

9. The polyamide ester composition according to item 7 or 8 above, wherein the plurality of different polyamide esters are individually produced by subjecting a plurality of different tetracarboxylic acid diesters individually or in combination to a condensation polymerization reaction with an amine in the presence of an organic dehydrating agent, wherein the plurality of different tetracarboxylic acid diesters have tetravalent aromatic groups X corresponding to the tetravalent aromatic groups X of the plurality of different polyamide esters and wherein the organic dehydrating agent is used in an amount of 0.90 to 0.99 equivalent per equivalent of each or the combination of the plurality of different tetracarboxylic acid diesters, the plurality of different tetracarboxylic acid diesters being individually, independently represented by the following formula (I"):

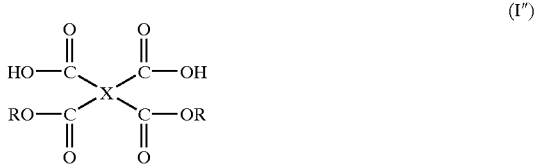

wherein:
X represents a tetravalent aromatic group having 6 to 32 carbon atoms; and
R represents a monovalent group containing an olefinic double bond,
the plurality of different tetracarboxylic acid diesters comprising:
a tetracarboxylic acid diester represented by the formula (I") wherein the tetravalent aromatic group X is a tetravalent benzene group (II) represented by the following formula (II):

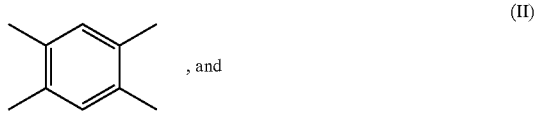, and a tetracarboxylic acid diester represented by formula (I") wherein the tetravalent aromatic group X is a tetravalent diphenyl ether group (III) represented by the following formula (III):

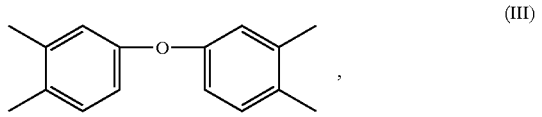, the tetracarboxylic acid diester containing the tetravalent benzene group (II) and the tetracarboxylic acid diester containing the tetravalent diphenyl ether group (III) being used such that the amounts of the tetravalent benzene group (II) and the tetravalent diphenyl ether group (III) in the polyamide ester composition are, respectively, 15 to 70 mole % and 15 to 50 mole %, based on the total molar amount of tetravalent aromatic groups X present in the polyamide ester composition, and the total amount of the tetravalent benzene group (II) and the tetravalent diphenyl ether group (III) in the polyamide ester composition becomes at least 50 mole %, based on the total molar amount of the tetravalent aromatic groups X present in the polyamide ester composition.

10. The polyamide ester composition according to item 9 above, wherein the plurality of different tetracarboxylic acid diesters are individually, independently obtained by individually reacting a plurality of different tetracarboxylic acid dianhydrides having tetravalent aromatic groups X corresponding to the X groups of the plurality of different tetracarboxylic acid diesters with an alcohol, wherein the alcohol is used in an amount of 1.01 to 1.10 equivalents per equivalent of each of the plurality of different tetracarboxylic acid dianhydrides.

11. A photosensitive composition comprising:
   (A) the polyamide ester of item 1 or 2 above, or the polyamide ester composition of item 7 or 8 above,
   (B) a photopolymerization initiator, and
   (C) a solvent for components (A) and (B).

12. A method for forming a polyimide pattern on a substrate, comprising:
   (i) providing a photosensitive composition comprising:
      (A) the polyamide ester of item 1 or 2 above, or the polyamide ester composition of item 7 or 8 above,
      (B) a photopolymerization initiator, and
      (C) a solvent for components (A) and (B);
   (ii) applying the photosensitive composition onto a substrate, followed by drying to thereby obtain a dried photosensitive composition coating formed on the substrate;
   (iii) exposing the dried photosensitive composition coating to UV light through a photomask bearing a pattern, followed by treatment with a solvent for the dried photosensitive composition to remove unexposed portions of the dried photosensitive composition coating, thereby forming a polyamide ester pattern on the substrate; and
   (iv) heating the polyamide ester pattern to imidize the polyamide ester present in the pattern, thereby obtaining a polyimide pattern formed on the substrate.

The present invention will now be described in detail.

The polyamide ester of the present invention comprises recurring units represented by the following formula (I):

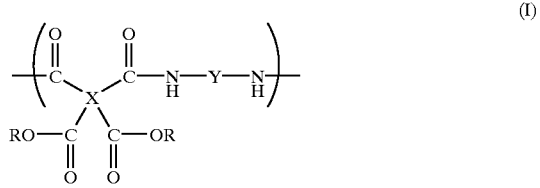

wherein:
each X independently represents a tetravalent aromatic group having 6 to 32 carbon atoms,
each Y independently represents a divalent organic group having 4 to 30 carbon atoms, and
each R independently represents a monovalent group containing an olefinic double bond.

The tetravalent aromatic groups X comprise:
15 to 70 mole %, based on the total molar amount of the tetravalent aromatic groups X, of a tetravalent benzene group (II) represented by the following formula (II):

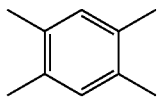
, and (II)

15 to 50 mole %, based on the total molar amount of the tetravalent aromatic groups X, of a tetravalent diphenyl ether group (III) represented by the following formula (III):

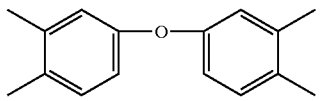
, (III)

with the proviso that the total amount of the tetravalent benzene group (II) and the tetravalent diphenyl ether group (III) is at least 50 mole %, based on the total molar amount of the tetravalent aromatic groups X.

The polyamide ester of the present invention is adapted to be converted to a polyimide in a coating form when a solution of the polyamide ester in a solvent for the polyamide ester is applied onto a silicon substrate to form a polyamide ester coating and heated at 350° C. for 2 hours in a nitrogen atmosphere, wherein the polyimide coating exhibits a residual stress of 33 MPa or less as measured with respect to a 10 μm-thick polyimide coating formed on the silicon substrate.

As described below, the polyamide ester of the present invention can be produced by a method in which a mixture of a plurality of different tetracarboxylic acid dianhydrides is subjected to an esterification reaction to obtain a mixture of a plurality of different tetracarboxylic acid diesters, and the obtained mixture of a plurality of different tetracarboxylic acid diesters is subjected to a condensation polymerization reaction with a diamine.

In the polyamide ester of the present invention, the X groups in the recurring units are groups originally contained in the tetracarboxylic acid dianhydrides used as starting materials. Examples of tetracarboxylic acid dianhydrides used in the present invention include compounds represented by the following formula (V):

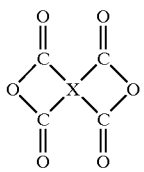

(V)

wherein X represents a tetravalent aromatic group having 6 to 32 carbon atoms.

As an example of the tetracarboxylic acid dianhydride having the above-mentioned tetravalent benzene group (II) as the X group, there can be mentioned pyromellitic acid dianhydride (PMDA). As an example of the tetracarboxylic acid dianhydride having the above-mentioned tetravalent diphenyl ether group (III) as the X group, there can be mentioned 4,4'-oxydiphthalic acid dianhydride (ODPA).

The polyamide ester of the present invention can be produced by, for example, a method in which a plurality of different tetracarboxylic acid diesters, which have been individually, separately prepared, are mixed, and the resultant mixture and a diamine are subjected to a polycondensation reaction. However, the polyamide ester of the present invention is generally produced by a method in which a mixture of a plurality of different tetracarboxylic acid dianhydrides is subjected to an esterification reaction to obtain a mixture of a plurality of different tetracarboxylic acid diesters, and the obtained tetracarboxylic acid diester mixture is in situ subjected to a condensation polymerization with a diamine. In the latter method, it is necessary that the amounts of the different tetracarboxylic acid dianhydrides are appropriately chosen so as to achieve the desired structural composition of the polyamide ester of the present invention. Specifically, in the production of the tetracarboxylic acid diester of the present invention, the above-mentioned benzene group (II)-containing tetracarboxylic acid dianhydride is used in an amount of 15 to 70 mol %, based on the total molar amount of the different tetracarboxylic acid dianhydrides, and the above-mentioned diphenyl ether group (III)-containing tetracarboxylic acid dianhydride is used in an amount of 15 to 50 mol %, based on the total molar amount of the different tetracarboxylic acid dianhydrides. In this case, it is necessary that the total amount of the above-mentioned benzene group (II)-containing tetracarboxylic acid dianhydride and the above-mentioned diphenyl ether group (III)-containing tetracarboxylic acid dianhydride is at least 50 mol %, based on the total molar amount of the different tetracarboxylic acid dianhydrides. In the present invention, it is preferred that the diphenyl ether group (III)-containing tetracarboxylic acid dianhydride is used in an amount of 30 to 45 mol %. When any of the benzene group (II)-containing tetracarboxylic acid dianhydride and the above-mentioned diphenyl ether group (III)-containing tetracarboxylic acid dianhydride are used in an amount of less than 15 mol %, the resultant polyamide ester has the same defects as in the case where only one of the above tetracarboxylic acid dianhydrides is used, so that it is impossible to obtain a polyamide ester which can be used in a photosensitive composition capable of providing a polyimide pattern having all of the above-mentioned desired properties. When the benzene group (II)-containing tetracarboxylic acid dianhydride is used in an amount exceeding 70 mol %, disadvantages are caused such that the elongation and the water resistant adhesion of a polyimide coating formed using the polyamide ester become disadvantageously low. When the diphenyl ether group (III)-containing tetracarboxylic acid dianhydride is used in an amount exceeding 50 mol %, the final polyimide pattern has a low heat resistance (which causes the heat deterioration of the polyimide pattern), a low chemical resistance, a high residual stress and the like.

With respect to other tetracarboxylic acid dianhydrides usable in the present invention (namely, tetracarboxylic acid dianhydrides other than the benzene group (II)-containing tetracarboxylic acid dianhydrides and the diphenyl ether group (III)-containing tetracarboxylic acid dianhydrides), there is no particular limitation and conventional tetracarboxylic acid dianhydrides can be used as long as the tetracarboxylic acid dianhydrides have structures represented by formula (V) above in which group X is a tetravalent aromatic group having 6 to 32 carbon atoms. Specific examples of the other tetracarboxylic acid dianhydrides include 3,3',4,4'-benzophenonetetracarboxylic dianhydride, 3,3',4,4'-diphenylsulfonetetracarboxylic dianhydride, 1,1,1, 3,3,3-hexafluoropropane-2,2-diphthalic dianhydride, 3,3'-biphenyltetracarboxylic dianhydride, 1,2,3,4-benzenetetracarboxylic dianhydride, 3,6-tri-fluoro-1,2,4,5-benzenetetracarboxylic dianhydride and tetracarboxylic acid dianhydrides represented by the following formula (VI):

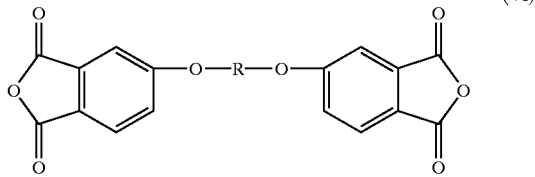

(VI)

wherein R represents an aromatic group represented by the following formulae (VII) or (VIII):

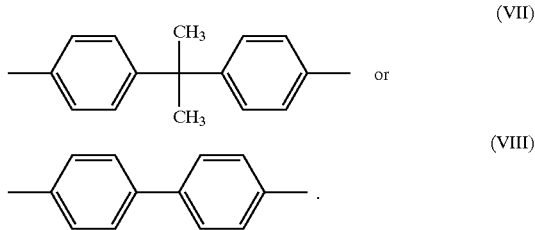

(VII) or (VIII)

The tetracarboxylic acid dianhydrides are reacted with alcohols containing an olefinic double bond to obtain corresponding tetracarboxylic acid diesters. Specific examples of alcohols containing an olefinic double bond include 2-methacryloyloxyethyl alcohol, 2-acryloyloxyethyl alcohol, 1-acryloyloxy-2-propyl alcohol, 2-methacrylamidoethyl alcohol, 2-acrylamidoethyl alcohol, methylol vinyl ketone, 2-hydroxyethyl vinyl ketone and 2-hydroxyethyl methacrylate. These alcohols can be used individually or in combination.

Further, as described in Unexamined Japanese Patent Application Laid-Open Specification No. 6-80776 (corresponding to U.S. Pat. No. 5,397,682), the above-mentioned alcohols containing an olefinic double bond may be used in combination with other alcohols, such as methyl alcohol, ethyl alcohol, n-propyl alcohol, isopropyl alcohol and allyl alcohol.

In a conventional method for the esterification of a tetracarboxylic acid dianhydride, an alcohol is used in an amount of 1.0 equivalent per equivalent of the tetracarboxylic acid dianhydride. On the other hand, in the present invention, it is preferred to use an alcohol in an amount of 1.01 to 1.10 equivalents per equivalent of the tetracarboxylic acid dianhydrides. When the tetracarboxylic acid diesters are produced using an alcohol in an amount within the above-mentioned range, the storage stability of a final photosensitive composition is improved.

In the polyamide ester of the present invention, the Y groups in the recurring units are groups originally contained in the diamines used as starting materials. Examples of diamines usable in the present invention include those represented by the following formula (IV):

$H_2N—Y—NH_2$ (IV)

wherein Y represents a divalent organic group having 4 to 20 carbon atoms.

In the present invention, an appropriate diamine (having, as group Y, a divalent organic group having 4 to 30 carbon atoms) is selected depending on the types and amounts of the tetracarboxylic acid dianhydrides used. Specifically, an appropriate diamine is selected so that, when the resultant polyamide ester is converted to a polyimide in a coating form, the residual stress measured with respect to a 10 μm-thick polyimide coating formed on the silicon substrate is 33 MPa or less. The diamine used in the present invention can be either an aromatic diamine or an aliphatic diamine, but an aromatic diamine is preferred.

With respect to the diamines used when the diphenyl ether group (III)-containing tetracarboxylic acid dianhydrides are used in an amount of from more than 45 mole % to not more than 50 mole %, examples thereof include aromatic diamines, such as p-phenylenediamine, 3,3'-dimethyl-4,4'-diaminobiphenyl, 2,2'-dimethyl-4,4'-diaminobiphenyl, 3,3'-dimethoxy-4,4'-diaminobiphenyl, 3,3'-dichloro-4,4'-diaminobiphenyl and 9,10-bis(4-aminophenyl)-anthracene. The use of the above-mentioned diamines in the production of the polyamide ester is especially advantageous for lowering the residual stress of a polyimide coating obtained from a photosensitive composition containing the polyamide ester.

With respect to the diamines used when the diphenyl ether group (III)-containing tetracarboxylic acid dianhydrides are used in an amount of from not less than 15 mole % to less than 30 mole %, examples thereof include aromatic diamines, such as 4,4'-diaminobenzo-phenone, 4,4'-diaminodiphenyl sulfone, 3,3'-diamino-diphenyl sulfone, 4,4'-diaminodiphenyl sulfoxide, 1,3-bis-(3-aminophenoxy)benzene, bis[4-(4-aminophenoxy)phenyl]sulfone, bis[4-(3-aminophenoxy)phenyl]sulfone, 4,4'-bis(4-aminophenoxy)biphenyl, 4,4'-bis(3-aminophenoxy)-biphenyl, bis[4-(4-aminophenoxy)phenyl]ether, 1,1,1,3,3,3-hexafluoro-2,2-bis(4-amino-phenyl)propane, 1,1,1,3,3,3-hexafluoro-2,2-bis[4-(4-aminophenoxy)phenyl]propane and 1,1,1,3,3,3-hexafluoro-2,2-bis(3-amino-4-methylphenyl)propane. The use of these diamines is especially advantageous for improving the resolution of the polyimide pattern obtained from a photosensitive composition containing the polyamide ester.

When the diphenyl ether group (III)-containing tetracarboxylic acid dianhydrides are used in an amount of 30 to 45 mole %, any of the above-exemplified diamines can be used. In addition, in this case, aromatic diamines other than exemplified above can be used. Examples of other diamines include m-phenylenediamine, 4,4'-diaminodiphenyl ether, 4,4'-diaminodiphenyl sulfide, 3,4'-diaminodiphenyl ether, 1,4-bis(4-aminophenoxy)benzene and 1,3-bis(4-aminophenoxy)benzene. Thus, a wide variety of diamines can be used when the diphenyl ether group (III)-containing tetracarboxylic acid dianhydrides are used in an amount of 30 to 45 mole %. Further, in this case, the synthesis of a polyamide ester having an excellent balance of various properties becomes easy. Preferred diamines are diamines containing two benzene rings, such as 4,4'-diaminodiphenyl ether and 3,3'-dimethyl-4,4'-diaminobiphenyl, which can be advantageously used for producing a polyamide ester having an excellent balance of various properties. The above-mentioned diamines can be used individually or in combination.

The molar ratio of the tetracarboxylic acid dianhydrides to the diamine is preferably around 1.0. However, depending on the molecular weight of the desired polyamide ester, the molar ratio may be chosen within the range of from 0.7 to 1.3.

In addition, in order to improve the properties of the photosensitive composition, such as an adhesive property, an aliphatic diamine can be used in combination with the above-mentioned aromatic diamines as long as the heat stability of the photosensitive composition is not lowered. Examples of aliphatic diamines include diaminopolysiloxane represented by the following formula (IX):

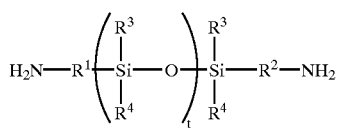
(IX)

wherein each of $R^1$ and $R^2$ independently represents a divalent hydrocarbon group; each of $R^3$ and $R^4$ independently represents a monovalent hydrocarbon group; and t represents an integer of 1 or more, preferably 1 to 10.

Specific examples of divalent hydrocarbon groups $R^1$ and $R^2$ in formula (IX) above include an alkylene group having 1 to 7 carbon atoms, such as a methylene group, an ethylene group and a propylene group; and an arylene group having 6 to 18 carbon atoms, such as a phenylene group. Specific examples of monovalent hydrocarbon groups $R^3$ and $R^4$ in formula (IX) above include an alkyl group having 1 to 7 carbon atoms, such as a methyl group and an ethyl group; and an aryl group having 6 to 12 carbon atoms, such as a phenyl group. When an aliphatic diamine is used, it is preferably used in an amount within a range of from 1 to 30 mol %, based on the total molar amount of the diamines used.

With respect to the specific methods for synthesizing the polyamide ester of the present invention, any conventional methods for synthesizing a polyamide ester can be used. For example, there can be mentioned a method described in Unexamined Japanese Patent Application Laid-Open Specification No. 61-127731 and in Example 5 of Unexamined Japanese Patent Application Laid-Open Specification No. 61-72022 (corresponding to U.S. Pat. No. 4,754,016 and EP177793B1), in which the condensation polymerization reaction of a tetracarboxylic acid diester and a diamine is conducted in the presence of an organic dehydrating agent; and a method described in Comparative Example 1 of the above-mentioned Unexamined Japanese Patent Application Laid-Open Specification No. 61-72022, in which a tetracarboxylic acid diester is first converted to a tetracarboxylic acid diester dioxychloride and then, the tetracarboxylic acid diester dioxychloride is subjected to a condensation polymerization reaction with a diamine.

As examples of other conventional methods for producing a polyamide ester, there can be mentioned a method of Minnema et al. described at page 815, Polym. Eng. Sci., Vol. 28, No. 12; and a method described in Examples I and II of Unexamined Japanese Patent Application Laid-Open Specification No. 58-120636 (corresponding to U.S. Pat. Nos. 4,416,973, 4,454,220, 4,430,418 and EP84269B1) which employs a glycidyl compound. However, these methods have a defect in that it is difficult to complete the esterification reaction for producing a polyamide ester and the resultant product is caused to contain unesterified polyamide acid.

Further, Unexamined Japanese Patent Application Laid-Open Specification No. 9-325478, Unexamined Japanese Patent Application Laid-Open Specification No. 9-325477, and Unexamined Japanese Patent Application Laid-Open Specification No. 9-329893 disclose methods for synthesizing a polyamide ester having improved storage stability and adhesiveness. However, the polyamide esters obtained by these methods have a disadvantageously high stress and a disadvantageously poor chemical resistance and thus, do not exhibit all of the desired properties.

As preferred examples of the method for producing the polyamide ester of the present invention, there can be mentioned the following methods 1 and 2.

In method 1, the polyamide ester is obtained from a tetracarboxylic acid diester dioxychloride mixture. Specifically, the polyamide ester is produced by a process comprising subjecting a tetracarboxylic acid diester dioxychloride mixture and a diamine to a condensation polymerization reaction in the presence of a basic compound, wherein the basic compound is used in an amount of not more than 0.5 equivalent per equivalent of acid by-produced during the condensation polymerization reaction.

The above-mentioned tetracarboxylic acid diester dioxychloride mixture comprises a plurality of different tetracarboxylic acid diester dioxychlorides, each independently represented by the following formula (I'):

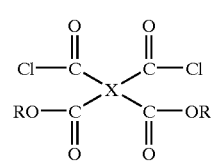
(I')

wherein:
X represents a tetravalent aromatic group having 6 to 32 carbon atoms,
R represents a monovalent group containing an olefinic double bond, and
Cl represents a chlorine atom,
the plurality of different tetracarboxylic acid diester dioxychlorides comprising:
15 to 70 mole %, based on the total molar amount of the plurality of different tetracarboxylic acid diester dioxychlorides, of a tetracarboxylic acid diester dioxychloride represented by the formula (I') wherein the tetravalent aromatic group X is a tetravalent benzene group (II) represented by the following formula (II):

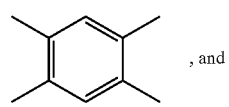
(II)
, and 15 to 50 mole %, based on the total molar amount of the plurality of different tetracarboxylic acid diester dioxychlorides, of a tetracarboxylic acid diester dioxychloride represented by formula (I') wherein the tetravalent aromatic group X is a tetravalent diphenyl ether group (III) represented by the following formula (III):

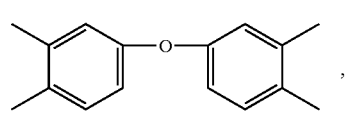
(III)
, with the proviso that the total amount of the tetracarboxylic acid diester dioxychloride containing the tetravalent benzene group (II) and the tetracarboxylic acid diester dioxychloride containing the tetravalent diphenyl ether group (III) is at least 50 mole %, based on the total molar amount of the plurality of different tetracarboxylic acid diester dioxychlorides.

Method 1 is described in more detail below.

The above-mentioned tetracarboxylic acid diester dioxychloride mixture can be produced as follows. A mixture of a plurality of different tetracarboxylic acid dianhydrides and an alcohol are dissolved in a solvent to thereby obtain a solution, and a basic compound is dropwise added to the solution while agitating the solution. The resultant mixture is further agitated at 0 to 30° C. preferably 10 to 25° C., for 10 to 30 hours, to thereby obtain a tetracarboxylic acid diester dioxychloride mixture. In conventional methods for producing a tetracarboxylic acid diester dioxychloride mixture, an alcohol is used in an amount of 1.0 equivalent per equivalent of the mixture of different tetracarboxylic acid dianhydrides. However, in the present invention, it is preferred that an alcohol is used in an amount of 1.01 to 1.10 equivalents per equivalent of the mixture of different tetracarboxylic acid dianhydrides. When a polyamide ester is produced from a tetracarboxylic acid diester mixture produced using an alcohol in an amount within the above-mentioned range, a photosensitive composition containing the produced polyamide ester exhibits an improved stability. It is preferred that the basic compound is used in an amount of not more than 0.5 equivalent per equivalent of acid by-produced during the condensation polymerization reaction. There is no particular limitation with respect to the lower limit of the amount of the basic compound, but it is preferred that the basic compound is used in an amount of not less than 0.4 equivalent.

After the addition of the basic compound to the solution, an acid chloride, such as thionyl chloride ($SOCl_2$) and oxanyl chloride, is dropwise added to the resultant mixture at −20 to 10° C. over a period of 30 minutes to 1 hour, and the mixture is allowed to stand at 10 to 20° C. for 1 to 5 hours. Further, if desired, unreacted acid chloride and by-products (such as $SO_2$) contained in the mixture are removed under a reduced pressure to thereby obtain a mixture of different tetracarboxylic acid diester dioxychlorides. It is preferred that the acid chloride is used in an amount of not less than 1.0 equivalent per equivalent of the mixture of different tetracarboxylic acid diesters.

The thus obtained tetracarboxylic acid diester dioxychloride mixture is subjected to the above-mentioned condensation polymerization reaction with a diamine. Specifically, to a reaction system containing the tetracarboxylic acid diester dioxychloride mixture is added a diamine solution or diamine suspension (obtained by dissolving or suspending a diamine in a solvent) at −20 to 0° C. over a period of 1 to 2 hours, followed by agitating at 10 to 25° C. for 15 to 30 hours, to thereby perform a condensation polymerization reaction. Then, an alcohol is added to the reaction system, followed by agitation at 10 to 30° C. for 1 to 2 hours, to thereby terminate the condensation polymerization reaction. Subsequently, a solvent is added to the resultant reaction mixture, and a polyamide ester is obtained by a conventional method for purifying polymers. With respect to the method for purifying the polymers, there is no particular limitation as long as the impurities are removed and the polymers are obtained in high yield. It is preferred that the purification method comprises a step for treating a crude polyamide ester with an anion exchange resin so as to remove chlorine atoms contained in the crude polyamide ester.

Examples of basic compounds used in method 1 include pyridine and triethylamine, but the basic compounds usable in method 1 are not limited to these compounds. As mentioned above, the basic compound is preferably used in an amount of not more than 0.5 equivalent per equivalent of acid by-produced during the condensation polymerization reaction. In Comparative Example 1 of the above-mentioned Unexamined Japanese Patent Application Laid-Open Specification No. 61-72022 (corresponding to U.S. Pat. No. 4,754,016 and EP177793B1), a basic compound (pyridine) is used in an amount of 1.06 equivalents per equivalent of acid by-produced during the condensation polymerization reaction. When a basic compound is used in an amount of more than 0.5 equivalent as in the case of Comparative Example 1 of the above prior art document, it is likely to become difficult to obtain a polyamide ester having an excellent balance of the various properties mentioned above. The reason for this is considered as follows. When a basic compound is used in an amount of not more than 0.5 equivalent per equivalent of the by-produced acid, the plurality of different tetracarboxylic acid diesters are obtained in the form of block copolymers, and such block copolymers are likely to exhibit the advantageous effects of the raw material tetracarboxylic acid dianhydrides. On the other hand, when a basic compound is used in an amount of more than 0.5 equivalent per equivalent of the by-produced acid, the reaction rate increases and the plurality of different tetracarboxylic acid diesters produced are likely to be in the form of random copolymers which are difficult to exhibit the advantageous effects of the raw material tetracarboxylic acid dianhydrides.

In method 2, the polyamide ester is produced by a process comprising subjecting a tetracarboxylic acid diester mixture and a diamine to a condensation polymerization reaction in the presence of an organic dehydrating agent. The tetracarboxylic acid diester mixture comprises a plurality of different tetracarboxylic acid diesters, each independently represented by the following formula (I"):

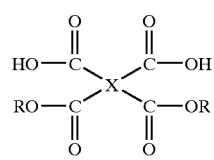

(I")

wherein:
X represents a tetravalent aromatic group having 6 to 32 carbon atoms; and
R represents a monovalent group containing an olefinic double bond,
the plurality of different tetracarboxylic acid diesters comprising:
15 to 70 mole %, based on the total molar amount of the plurality of different tetracarboxylic acid diesters, of a tetracarboxylic acid diester represented by the formula (I") wherein the tetravalent aromatic group X is a tetravalent benzene group (II) represented by the following formula (II):

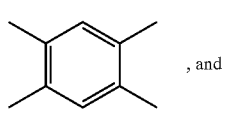

(II)

, and 15 to 50 mole %, based on the total molar amount of the plurality of different tetracarboxylic acid diesters, of a tetracarboxylic acid diester represented by the formula (I") wherein the tetravalent aromatic group X is a tetravalent diphenyl ether group (III) represented by the following formula (III):

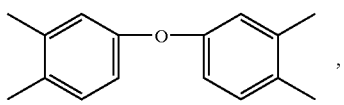
(III)

with the proviso that the total amount of the tetracarboxylic acid diester containing the tetravalent benzene group (II) and the tetracarboxylic acid diester containing the tetravalent diphenyl ether group (III) is at least 50 mole %, based on the total molar amount of the plurality of different tetracarboxylic acid diesters.

Method 2 is explained in more detail below.

In method 2, a plurality of different tetracarboxylic acid dianhydrides and an alcohol are dissolved in a solvent to thereby obtain a solution, and a basic compound is dropwise added to the solution while agitating the solution. The resultant mixture is further agitated at 0 to 40° C., preferably 15 to 25° C., for 10 to 30 hours, to thereby obtain a tetracarboxylic acid diester mixture. As explained above, in the present invention, an alcohol is preferably used in an amount of 1.01 to 1.10 equivalents per equivalent of the plurality of different tetracarboxylic acid dianhydrides.

Then, a solution of an organic dehydrating agent is dropwise added to the obtained tetracarboxylic acid diester mixture at −20 to 0° C. over a period of 30 minutes to 1 hour while agitating. With respect to the dehydrating agent, in conventional methods for producing a polyamide ester, it is used in an amount of not less than 1.0 equivalent per equivalent of the mixture of different tetracarboxylic acid diesters. However, in the present invention, it is preferred to produce a polyamide ester using the dehydrating agent in an amount of 0.90 to 0.99 equivalent per equivalent of the mixture of different tetracarboxylic acid diesters, because the storage stability of a photosensitive composition containing the produced polyamide ester is improved. It is more preferred that the dehydrating agent is used in an amount of 0.95 to 0.99 equivalent from the viewpoint of improving the storage stability of the photosensitive composition.

To the resultant mixture is added a diamine solution or diamine suspension (obtained by dissolving or suspending a diamine in a solvent) at −20 to 0° C. over a period of 30 minutes to 1.5 hours, followed by agitating at 0 to 30° C. for 1 to 10 hours to perform a reaction. Then, an alcohol is added to the reaction system, followed by agitating at 10 to 30° C. for 1 to 2 hours, to thereby terminate the reaction. To the resultant reaction mixture is added a solvent, and a polyamide ester is obtained by a conventional method for purifying polymers. With respect to the method for purifying polymers, the methods mentioned above in connection with method 1 can be used.

In method 2, as in method 1 mentioned above, a tetracarboxylic acid diester mixture and a diamine may be subjected to a condensation polymerization reaction in the presence of a basic compound. It is preferred that the basic compound be used in an amount of 0.95 to 1.30 equivalents per equivalent of acid by-produced during the condensation polymerization reaction.

Examples of organic dehydrating agents used in method 2 include dicyclohexyl carbodiimide (DCC), diethyl carbodiimide, diisopropyl carbodiimide, ethyl-cyclohexyl carbodiimide, diphenyl carbodiimide, 1-ethyl-3-(3-dimethylaminopropyl) carbodiimide, 1-cyclohexyl-3-(3-dimethylaminopropyl) carbodiimide hydrochloride and carbodiimide. In conventional methods, a dehydrating agent is generally used in an amount of 1.0 equivalent per equivalent of tetracarboxylic acid dianhydride. However, in the present invention, for improving the stability of the photosensitive composition, it is preferred that the dehydrating agent be used in an amount of 0.90 to 0.99 equivalent, more advantageously 0.95 to 0.99 equivalent, per equivalent of the tetracarboxylic acid dianhydride mixture.

Both of the above-mentioned methods 1 and 2 may be conducted under atmospheric pressure.

There is no particular limitation with respect to the solvents used in method 1 and method 2 as long as the solvents dissolve all of the components used and do not induce side reactions, and as long as the produced polyamide ester exhibits a high solubility in the solvents. Examples of such solvents include tetrahydrofuran, γ-butyrolactone, dioxane, dimethylformamide, dimethylacetoamide, N-methylpyrrolidone (NMP), hexamethylphosphoryltriamide, chlorobenzene, acetone, methyl ethyl ketone, methyl isobutyl ketone, cyclohexanone, cyclopentanone, methylene chloride, chloroform, 1,2-dichloroethane, ethyl acetate, diethyl ether and dimethyl sulfoxide. A plurality of solvents may be used when the solvents are miscible with each other. The amount of the solvent used for the esterification reaction is preferably 700 ml to 2 liters per mole of the tetracarboxylic acid dianhydride. The amount of the solvent used for dissolving the dehydrating agent is preferably 60 to 400 ml per mole of the dehydrating agent. The amount of the solvent used for suspending or dissolving the diamine is preferably 500 ml to 1 liter per mole of the diamine. The amount of the solvent added to the reaction mixture after the termination of the reaction is preferably 500 ml to 1.5 liters per mole of the tetracarboxylic acid diester dioxychloride or the tetracarboxylic acid diester.

As an alcohol used for terminating the reaction, a lower alcohol, such as methanol or ethanol, can be used. The alcohol for this purpose is generally used in an amount of 20 to 80 ml per mole of the tetracarboxylic acid diester dioxychloride or the tetracarboxylic acid diester.

The number average molecular weight of the polyamide ester of the present invention is preferably 8,000 to 150,000, more preferably 9,000 to 50,000.

In another embodiment of the present invention, there is provided a polyamide ester composition comprising a plurality of different polyamide esters. There is no particular limitation with respect to the different polyamide esters contained in the polyamide ester composition as long as each of the polyamide esters independently comprises the recurring units represented by formula (I) above. Therefore, in the polyamide ester composition of the present invention, there is no need for all of the different polyamide esters to have the above-mentioned molar ratios of groups (II) and (III) which are required in the polyamide ester of the present invention. For example, the different polyamide esters used in the polyamide ester composition of the present invention may be independently a homopolymer consisting of the recurring units of formula (I), each having a tetravalent benzene group (II) or a tetravalent diphenyl ether group (III). However, the different polyamide esters must collectively contain, as the tetravalent aromatic groups X, the following two types of groups: 15 to 70 mole %, based on the total molar amount of the tetravalent aromatic groups X, of the tetravalent benzene group (II), and 15 to 50 mole %, based on the total molar amount of the tetravalent aromatic groups X, of the tetravalent diphenyl ether group (III), with the proviso that the total amount of the tetravalent benzene group (II) and the tetravalent diphenyl ether group (III) is at least 50 mole %, based on the total molar amount of the tetravalent aromatic groups X. Further, it is required that when a solution of the polyamide ester composition in a solvent for the polyamide ester composition is applied onto a silicon substrate to form a polyamide ester composition coating and heated at 350° C. for 2 hours in a nitrogen atmosphere, the polyamide ester composition of the present invention is converted to a polyimide composition in a coating form, and the resultant polyimide composition coating exhibits a residual stress of 33 MPa or less as measured with respect to a 10 μm-thick polyimide composition coating formed on the silicon substrate.

The number average molecular weight of the polyamide esters used in the polyamide ester composition of the present invention is preferably 8,000 to 150,000, more preferably 9,000 to 50,000.

The different polyamide esters used in the polyamide ester composition of the present invention can be individually produced by the above-mentioned methods for producing a polyamide ester. However, from the viewpoint of the storage stability of the polyamide ester composition, it is preferred that the polyamide ester composition is produced by a method in which a plurality of different tetracarboxylic acid diesters is individually or in combination subjected to a condensation polymerization reaction with a diamine in the presence of an organic dehydrating agent, wherein the plurality of different tetracarboxylic acid diesters have tetravalent aromatic groups X corresponding to the tetravalent aromatic groups X of the plurality of different polyamide esters and wherein the organic dehydrating agent is used in an amount of 0.90 to 0.99 equivalent per equivalent of each or the combination of the plurality of different tetracarboxylic acid diesters.

The plurality of different tetracarboxylic acid diesters are individually, independently represented by the following formula (I"):

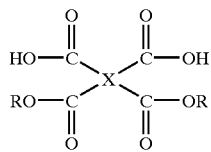

(I")

wherein:
X represents a tetravalent aromatic group having 6 to 32 carbon atoms; and
R represents a monovalent group containing an olefinic double bond.

The plurality of different tetracarboxylic acid diesters comprise:
a tetracarboxylic acid diester represented by formula (I") above wherein the tetravalent aromatic group X is a tetravalent benzene group (II) represented by the following formula (II):

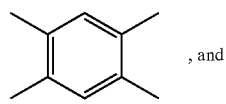, and (II)

a tetracarboxylic acid diester represented by formula (I") above wherein the tetravalent aromatic group X is a tetravalent diphenyl ether group (III) represented by the following formula (III):

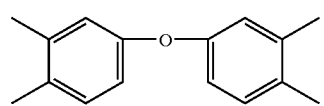

(III)

The tetracarboxylic acid diester containing the tetravalent benzene group (II) and the tetracarboxylic acid diester containing the tetravalent diphenyl ether group (III) are used such that the amounts of the tetravalent benzene group (II) and the tetravalent diphenyl ether group (III) in the polyamide ester composition are, respectively, 15 to 70 mole % and 15 to 50 mole %, based on the total molar amount of tetravalent aromatic groups X present in the polyamide ester composition, and the total amount of the tetravalent benzene group (II) and the tetravalent diphenyl ether group (III) in the polyamide ester composition becomes at least 50 mole %, based on the total molar amount of the tetravalent aromatic groups X present in the polyamide ester composition.

In addition, it is preferred that the plurality of different tetracarboxylic acid diesters are individually, independently obtained by individually reacting a plurality of different tetracarboxylic acid dianhydrides having tetravalent aromatic groups X corresponding to groups X of the plurality of different tetracarboxylic acid diesters with an alcohol, wherein the alcohol is used in an amount of 1.01 to 1.10 equivalents per equivalent of each of the plurality of different tetracarboxylic acid dianhydrides.

In still another embodiment of the present invention, there is provided a photosensitive composition comprising (A) the above-mentioned polyamide ester or the above-mentioned polyamide ester composition, (B) a photopolymerization initiator, and (C) a solvent for components (A) and (B).

As mentioned above, when the polyamide ester or the polyamide ester composition of the present invention is used as a polyimide precursor in a photosensitive composition, it becomes possible to prepare a photosensitive composition which can be used for forming a polyimide pattern which simultaneously exhibits a high precision, a low residual stress, a high water resistant adhesion, a high elongation, a high chemical resistance and a high heat stability.

Examples of photopolymerization initiators used as component (B) of the photosensitive composition of the present invention include benzophenone and derivatives thereof, such as methyl o-benzoylbenzoate, 4-benzoyl-4'-methyldiphenyl ketone, dibenzyl ketone and fluorenone; acetophenone derivatives, such as 2,2'-diethoxyacetophenone and 2-hydroxy-2-methylpropiophenone; 1-hydroxycyclohexyl phenyl ketone; thioxanthone and derivatives thereof, such as 2-methylthioxanthone, 2-isopropylthioxanthone and diethylthioxanthone; benzil and derivatives thereof, such as benzyldimethylketal and benzyl-β-methoxyethyl acetal; benzoin derivatives, such as benzoin methyl ether; azides, such as 2,6-di(4'-diazidobenzal)-4-methylcyclohexanone and 2,6'-di(4'-diazidobenzal)cyclohexanone; oximes, such as 1-phenyl-1,2-butanedione-2-(o-methoxycarbonyl)oxime, 1-phenyl-propanedione-2-(o-methoxycarbonyl)oxime, 1-phenyl-propanedione-2-(o-ethoxycarbonyl)oxime, 1-phenyl-propanedione-2-(o-benzoyl)oxime, 1,3-diphenyl-propanetrione-2-(o-ethoxycarbonyl)oxime and 1-phenyl-3-ethoxy-propanetrione-2-(o-benzoyl)oxime; N-arylglycines, such as N-phenylglycine; peroxides, such as benzoyl peroxide; aromatic biimidazoles; and titanocenes. From the viewpoint of light sensitivity, oximes are preferred. It is preferred that the amount of photopolymerization initiator to be contained in a photosensitive composition of the present invention is 1 to 15 parts by weight, relative to 100 parts by weight of the polyimide precursor, i.e., the polyamide ester or the polyamide ester composition.

With respect to the solvent as component (C), in view of the solubility of components (A) and (B), it is preferred to use a polar solvent. Representative examples of polar solvents include N,N-dimethylformamide, N-methylpyrrolidone, N-ethyl-2-pyrrolidone, N,N-dimethylacetoamide, diethylene glycol dimethyl ether, cyclopentanone, γ-butyrolactone, α-acetyl-γ-butyrolactone, tetramethylurea, 1,3-dimethyl-2-imidazolinone and N-cyclohexyl-2-pyrrolidone. These solvents may be used individually or in combination. In view of the desired thickness of the coating and the desired viscosity of the photosensitive composition, the amount of solvent used may be selected within the range of from 100 to 400 parts by weight, relative to 100 parts by weight of the polyimide precursor, i.e., the polyamide ester or the polyamide ester composition.

In addition to the above-mentioned essential components (A) to (C), the photosensitive composition of the present invention may further comprise an additional compound having a reactive carbon-carbon double bond for improving the light sensitivity of the composition. Representative examples of additional compounds having a reactive carbon-carbon double bond include 1,6-hexanediol diacrylate, neopentyl glycol diacrylate, ethylene glycol diacrylate, polyethylene glycol diacrylate (having 2 to 20 ethylene glycol units), pentaerythritol diacrylate, dipentaerythritol hexaacrylate, tetramethylolmethane tetraacrylate, methylenebis(acrylamide), N-methylolacrylamide, and methacrylates and methacrylamides corresponding to the acrylates and acrylamides mentioned above. It is preferred that the additional compound having a reactive carbon-carbon double bond is added in an amount within the range of from 1 to 30 parts by weight, relative to 100 parts by weight of the polyimide precursor, i.e., the polyamide ester or the polyamide ester composition.

Further, to the photosensitive composition of the present invention, a sensitizing agent can be added for improving the light sensitivity of the composition. Representative examples of sensitizing agents include Michler's ketone, 4,4'-bis(diethylamino)benzophenone, 2,5-bis(4'-diethylaminobenzal)cyclopentane, 2,6-bis-(4'-diethylaminobenzal)cyclohexanone, 2,6-bis(4'-dimethylaminobenzal)-4-methylcyclohexanone, 2,6-bis(4'-diethylaminobenzal)-4-methylcyclohexanone, 4,4'-bis (dimethylamino)chalcone, 4,4'-bis(diethylamino)chalcone, p-dimethylaminocinnamylideneindanone, p-dimethylamino-benzylideneindanone, 2-(p-dimethylaminophenyl-biphenylene)-benzothiazole, 2-(p-dimethylaminophenyl-vinylene)-benzothiazole, 2-(p-dimethylaminophenyl-vinylene)-isonaphthothiazole, 1,3-bis(4'-dimethylaminobenzal)acetone, 1,3-bis(4'-diethylaminobenzal)-acetone, 3,3-carbonyl-bis(7-diethylaminocoumarin), 3-acetyl-7-dimethylaminocoumarin, 3-ethoxycarbonyl-7-dimethylaminocoumarin, 3-benzyloxycarbonyl-7-dimethylaminocoumarin, 3-methoxycarbonyl-7-diethylaminocoumarin, 3-ethoxycarbonyl-7-diethylaminocoumarin, N-phenyl-N-ethylethanolamine, N-phenyldiethanolamine, N-p-tolyl-diethanolamine, N-phenylethanolamine, 4-morpholino-benzophenone, isoamyl dimethylaminobenzoate, isoamyl diethylaminobenzoate, 2-mercaptobenzimidazole, 1-phenyl-5-mercaptotetrazole, 2-mercaptobenzothiazole, 2-(p-dimethylaminostyryl)benzoxazole, 2-(p-dimethylaminostyryl)benzthiazole, 2-(p-dimethylaminostyryl)naphtho(1,2-d)thiazole and 2-(p-dimethylaminobenzoyl)styrene. From the viewpoint of the sensitivity of the agent, a compound having a mercapto group and a compound having a dialkylaminophenyl group are advantageously used in combination. It is preferred that the amount of sensitizing agent added to the photosensitive composition of the present invention is 0.1 to 10 parts by weight, relative to 100 parts by weight of the polyimide precursor, i.e., the polyamide ester or the polyamide ester composition.

For improving the adhesion property of the polyimide coating to a substrate, an adhesion promoter can be added to the photosensitive composition of the present invention. Representative examples of adhesion promoters include γ-aminopropyldimethoxysilane, N-(β-aminoethyl)-γ-aminopropylmethyldimethoxysilane, γ-glycidoxypropylmethyldimethoxysilane, γ-mercaptopropylmethyldimethoxysilane, 3-methacryloxypropyldimethoxymethylsilane, 3-methacryloxypropyltrimethoxysilane, dimethoxymethyl-3-piperidinopropylsilane, diethoxy-3-glycidoxypropylmethylsilane, N-(3-diethoxymethylsilylpropyl)succinimide, N-[3-(triethoxysilyl)propyl]phthalamic acid, benzophenone-3,3'-bis[N-(3-triethoxysilyl)propylamido]-4,4'-dicarboxylic acid and benzene-1,4-bis[N-(3-triethoxysilyl)propylamido]-2,5-dicarboxylic acid. It is preferred that the amount of adhesion promoter added to the photosensitive composition of the present invention is 0.5 to 10 parts by weight, relative to 100 parts by weight of the polyimide precursor, i.e., the polyamide ester or the polyamide ester composition.

For stabilizing the viscosity and light sensitivity of a solution of the composition during storage, a thermopolymerization inhibitor can be added to the photosensitive composition. Representative examples of thermopolymerization inhibitors include hydroquinone, N-nitrosodiphenylamine, p-t-butylcatechol, phenothiazine, N-phenylnaphthylamine, ethylenediaminetetraacetic acid, 1,2-cyclohexanediaminetetraacetic acid, glycoletherdiaminetetraacetic acid, 2,6-di-t-butyl-p-methylphenol, 5-nitroso-8-hydroxyquinoline, 1-nitroso-2-naphthol, 2-nitroso-1-naphthol, 2-nitroso-5-(N-ethyl-N-sulfopropylamino)phenol, N-nitroso-N-phenylhydroxylamine ammonium salt and N-nitroso-N(1-naphthyl)hydroxylamine ammonium salt. It is preferred that the amount of thermopolymerization inhibitor to be added to the photosensitive composition of the present invention is 0.005 to 5 parts by weight, relative to 100 parts by weight of the polyimide precursor, i.e., the polyamide ester or the polyamide ester composition.

In a further aspect of the present invention, there is provided a method for forming a polyimide pattern on a substrate, comprising:
(i) providing the above-mentioned photosensitive composition;
(ii) applying the photosensitive composition onto a substrate, followed by drying to thereby obtain a dried photosensitive composition coating formed on the substrate;
(iii) exposing the dried photosensitive composition coating to UV light through a photomask bearing a pattern, followed by treatment with a solvent for the dried photosensitive composition to remove unexposed portions of the dried photosensitive composition coating, thereby forming a polyamide ester pattern on the substrate; and
(iv) heating the polyamide ester pattern to imidize the polyamide ester present in the pattern, thereby obtaining a polyimide pattern formed on the substrate.

Examples of substrates usable in the present invention include a silicon wafer, a metal, a glass, a semiconductor, a metal oxide insulating membrane and a silicon nitride. Of these, a silicon wafer is preferred. There is no particular limitation with respect to the thickness of the substrate, but it is preferred that the thickness of the substrate is 200 to 800 µm.

The photosensitive composition of the present invention can be applied to a substrate by a conventional method used for applying a photosensitive composition to a substrate. For example, the photosensitive composition can be coated on a substrate by means of a spin coater, a bar coater, a blade coater, a curtain coater, a screen printing press or the like, or sprayed onto a substrate by means of a spraying coater. The coating of the photosensitive composition on the substrate can be dried by an appropriate method, for example, airdrying, heat-drying in an oven or on a hot plate, and vacuum-drying. In addition, it is preferred that the coating is dried under conditions wherein the polyamide esters contained in the photosensitive composition are not imidized. For this purpose, specifically, each of the air-drying and the heat-drying is generally conducted at 20 to 140° C. for 1 minute to 1 hour, and it is preferred that the heat-drying is conducted using a hot plate for 1 to 5 minutes. The vacuum drying can be conducted at room temperature for 1 minute to 1 hour.

The resultant coating is subjected to exposure to ultraviolet rays etc. by using a light exposure machine, such as a contact aligner, a mirror projection aligner, and a stepper, and subsequently developed using a developing liquid. As the developing liquid, it is preferred to use a good solvent for the polyimide precursor. However, such a good solvent may be used in combination with a poor solvent for the polyimide precursor. Representative examples of good solvents include N-methylpyrrolidone, N-cyclohexyl-2-pyrrolidone, N,N'-dimethylacetoamide, cyclopentanone, cyclohexanone, γ-butyrolactone and α-acetyl-γ-butyrolactone. Representative examples of poor solvents include toluene, xylene, methanol, ethanol, isopropyl alcohol, ethyl lactate, propylene glycol methyl ether acetate and water. The ratio of the poor solvent to the good solvent is adjusted depending on the solubility of the polyimide precursor to be used. With respect to each of the good and poor solvents, different types of solvents can also be used in combination. The imagewise exposed coating can be developed by a conventional method customarily used for developing a photoresist, such as a spin-spray method, a puddle method, and a dipping method with supersonic waves.

When the resultant patterned coating of the polyimide precursor is heated, components (such as the above-mentioned alcohol containing an olefinic double bond and the above-mentioned photopolymerization initiator) participating in the photopolymerization are evaporated-off, so that the polyimide precursor pattern coating is converted to a cured polyimide resin pattern coating. The heat-curing can be carried out by a method, such as a method using a hot plate, an oven, or a temperature programmed oven. The heating can be conducted at 280 to 450° C. for 30 to 5 hours. Inert gas, such as nitrogen and argon, and air may be used as an atmosphere in the treatment for heat-curing the patterned coating.

When a polyimide coating obtained by heat-curing the polyamide ester of the present invention is subjected to a thermal mechanical analysis (TMA), two inflexion points are observed in the TMA curve, that is one point in the range of from 220 to 280° C. and the other point in the range of from 320 to 380° C. Therefore, a polyimide obtained from the polyamide ester of the present invention as a polyimide precursor has a plurality of glass transition temperatures. The reason for such a unique property is considered as follows. In the above-mentioned preferred method for producing the polyamide ester of the present invention, the polyamide ester is obtained in the form of a block copolymer due to the difference in the reactivity between the above-mentioned benzene group (II)-containing tetracarboxylic acid dianhydride and the above-mentioned diphenyl ether group (III)-containing tetracarboxylic acid dianhydride which are the essential raw materials. Unexamined Japanese Patent Application Laid-Open Specification No. 60-147441 (corresponding to U.S. Pat. No. 4,590,258 and EP154720B1) describes that a polyimide in the form of a "block copolymer" is obtained. However, each of the polyimides prepared in the Examples has a single glass transition temperature (Tg). Further, with respect to the polyimide obtained in the Examples of this prior art document, it is described that the β-transition of the polyimide at 190 to 200° C. disappeared during the heating cycle and this indicates the change in polymer structure. However, actually, the disappearance of the β-transition is caused by factors (caused during the heating cycle) other than the change in the polymer structure of the polyimide. Therefore, it is apparent that the polyimide disclosed in the above-mentioned prior art document has a structure which is different from that of the polyimide obtained by curing the polyamide ester of the present invention, and the polyimide disclosed in this document is considered to be a random copolymer.

BEST MODE FOR CARRYING OUT THE INVENTION

Hereinbelow, the present invention will be described in more detail with reference to the following Examples and Comparative Examples, which should not be construed as limiting the scope of the present invention.

In the following Examples and Comparative Examples, the properties of a photosensitive composition and the like were measured and evaluated by the following methods.

(1) Number Average Molecular Weight

The number average molecular weight of a polyamide ester is measured by gel permeation chromatography, using a calibration curve obtained with respect to standard polystyrene samples.

(2) Residual Stress

A photosensitive composition was spin-coated on a 5-inch silicon wafer (manufactured and sold by Fijimi Electronic Industry Co. Ltd., Japan) (substrate) having a thickness of 625 μm±25 μm in an amount wherein the thickness of a cured coating (obtained by heat-curing the photosensitive composition) becomes about 10 μm, followed by heating at 350° C. in a nitrogen atmosphere for 2 hours to obtain a cured polyimide coating. With respect to the resultant substrate having the cured polyimide coating formed thereon, the radius of the curvature caused by the formation of the cured polyimide coating was measured by means of a thin film stress measuring system (FLX-2320, manufactured and sold by KLA Tencor Corporation, U.S.A.). Using the obtained value of the curvature radius, the average stress (a) of the polyimide coating was obtained as the residual stress of the cured polyimide coating by the following formula:

$$\sigma = Eh^2/\{(1-v)6Rt\} \quad (1)$$

| | |
|---|---|
| E/(1-v): | biaxial elastic modulus of the substrate |
| h: | thickness of the substrate |
| t: | thickness of the coating |
| R: | curvature radius of the substrate |
| σ: | average stress of the coating |

With respect to the polyamide ester or the polyamide ester composition, the residual stress of a cured polyimide coating formed on a silicon wafer using the solution of the polyamide ester or the solution of the polyamide ester composition was measured in the same manner as mentioned above and was found to be the same as that of a cured polyimide coating formed using the solution of a photosensitive composition (comprising the above-mentioned polyamide ester or the above-mentioned polyamide ester composition, and a photopolymerization initiator and a solvent for these components). With resect to the viscosity of each of the polyamide ester solution, the polyamide ester composition solution and the photosensitive composition, there is no particular limitation as long as the thickness of the coating obtained by heat-curing can become 10 μm. However, it is preferred that the viscosity is in the range of from 20 to 60 poises. With respect to the solvent used for obtaining the polyamide ester solution and the polyamide ester composition solution, any of the above-mentioned solvents which can be used in the photosensitive composition can be used.

(3) Elongation of the Polyimide Coating

A polyimide coating was formed on a silicon wafer in the same manner as in item (2) above. From the silicon wafer, the formed polyimide coating was peeled off using hydrofluoric acid to obtain a polyimide tape. The elongation of the polyimide tape was measured in accordance with ASTM-D-882-88. When the elongation of a polyimide coating is 30% or more, the elongation of the polyimide coating is satisfactorily high.

(4) Resolution of the Photosensitive Composition and Precision of the Polyimide Pattern A photosensitive composition was spin-coated on a 5-inch silicon wafer and dried to form a coating having a thickness of 10 μm. The coating formed on the silicon wafer was exposed to a light having an energy of 300 mJ/cm through a reticle bearing a test pattern image, using an i-line stepper NSR1755i7B (manufactured and sold by Nikon Corporation, Japan). Then, the exposed coating on the silicon wafer was subjected to a spray-developing by means of a developing machine (D-SPIN 636, manufactured and sold by Dainippon Screen Manufacturing Co., Ltd., Japan), using cyclopentanone as a developing liquid, and propylene glycol methyl ether acetate as a rinse, to thereby obtain a pattern of the polyimide precursor.

The resultant silicon wafer was heated first at 200° C. for 1 hour and then at 390° C. for 1 hour in a nitrogen atmosphere in a temperature-programmed curing furnace (VF-2000, manufactured and sold by Koyo Lindberg Co., Ltd., Japan), to form a polyimide pattern on the silicon wafer. With respect to the obtained pattern, the contour thereof and the pattern width were observed under an optical microscope to evaluate the resolution of the photosensitive composition. Specifically, the evaluation was conducted as follows. The obtained polyimide pattern had a positive pattern image inversely corresponding to the above-mentioned test pattern image of the reticle, and had square openings (i.e., openings of through-holes formed in the polyimide pattern) having different areas. The evaluation of the resolution was conducted with respect only to the square openings, each having an area which is at least ½ of the area of the inversely corresponding square image in the test pattern image of the reticle (i.e., the square openings, each having an area smaller than mentioned above, were ignored), and the length of the side of the minimum square opening formed in the polyimide pattern is measured as the resolution. When the minimum opening has a side of 6 μm or less, the resolution is good.

Further, the precision of the pattern was evaluated, based on the following criteria.

Good: A pattern satisfies the conditions that the resolution is 8 μm or less, that the through-holes formed in the pattern have none of the following defects: hemming bottom, swelling and bridging, and that the shape of the polyimide precursor pattern does not change during the heat-curing (imidization) of the polyimide precursor pattern.

Poor: A polyimide pattern does not satisfy any one of the conditions mentioned above.

(5) Chemical Resistance

Two silicon wafers having polyimide patterns formed thereon (produced in the same manner as mentioned in item (4) above) were, respectively, immersed in two different solutions at 85° C. for 1 hour, wherein the two different solutions were, respectively, a solution (release agent 710, manufactured and sold by TOKYO OHKA KOGYO CO., Ltd., Japan) comprising 55% by weight of o-dichlorobenzene, 25% by weight of phenol and 20% by weight of an alkylbenzenesulfonic acid, and a solution (AZ-300T, manufactured and sold by Clariant Japan, Japan) comprising 55% by weight of propylene glycol, 41% by weight of N-methylpyrrolidone (NMP) and 4% by weight of tetramethylammonium hydroxide. Then, the silicon wafers were taken out of the solutions, and washed with water, followed by drying. With respect to each of the resultant silicon wafers, the evaluation of the chemical resistance of the polyimide pattern was conducted by measuring the thickness of the patterns and by visual observation. When one or both of the two polyimide patterns suffered a thickness change to a degree outside the range of ±3% and/or cracking, the evaluation of the chemical resistance of the polyimide of the two polyimide patterns was "poor". On the other hand, when both of the two polyimide patterns do not suffer either a thickness change to a degree outside the range of ±3% or cracking, the evaluation of the chemical resistance of the polyimide of the two polyimide patterns was "good".

(6) Water Resistant Adhesion

A polyimide coating was formed on a silicon wafer in the same manner as in item (2) above. The resultant polyimide coating on the wafer was placed and left in a pressure-cooker at 133° C. under a pressure of 2 kg/mm² and a relative humidity (RH) of 100% for 100 hours, and then dried in an oven at 50° C. for 2 hours.

With respect to the resultant polyimide coating, the adhesiveness thereof to an epoxy resin was evaluated by a pulling test, as explained below. To the polyimide coating on the wafer was adhered a pin having a diameter of 2 mm, using an epoxy resin adhesive (Araldite® standard, manufactured and sold by Showa Highpolymer Co., Ltd., Japan). Then, pulling tests were conducted using a pulling tester (SEBASTIAN 5 type, manufactured and sold by Quad Company Group, U.S.A). From the obtained pulling stress, the water resistant adhesion was evaluated, based on the following criteria:

Pulling stress of 7 kg/mm² or more: Good adhesion

Pulling stress of 5 kg/mm² to less than 7 kg/mm²: Adhesion is not so good but acceptable in practical use.

Pulling stress of less than 5 kg/mm²: Poor adhesion.

(7) Viscosity of a Photosensitive Composition

The viscosity of a photosensitive composition was determined by conducting a measurement at 23° C. using an E-type viscometer (RE80, manufactured and sold by Tokyo Keiki Co., Ltd., Japan), and comparing data obtained by the measurement with those data which were obtained with respect to standard solutions for viscosity calibration (JS 2000, manufactured and sold by Showa Shell Sekiyu K.K., Japan).

Further, as a yardstick for the storage stability of a photosensitive composition, the change in viscosity was obtained as follows. The polyamide ester of the present invention or the polyamide ester composition of the present invention (component (A)) was dissolved in a solvent (component (C)), together with a photopolymerization initiator (component (B)), a compound having a reactive carbon-carbon double bond and a sensitizing agent (which were used to improve the photosensitivity), an adhesion promotor and a thermal polymerization inhibitor, to obtain a photosensitive composition, wherein the amount of the solvent was adjusted such that the viscosity of the photosensitive composition becomes 40 poises. The obtained photosensitive composition was allowed to stand at room temperature, and the viscosity of the photosensitive composition was determined in the same manner as mentioned above, at two points in time, namely two days and two weeks after the production of the composition. The change (%) in the viscosity which occurred during these two points in time was obtained. The change in viscosity of the polyamide ester or the polyamide ester composition occurs due to the change in the state of agglomeration of polymer chains of the polyamide ester, side reactions between the polyamide ester and additives, and the like. The smaller the change in viscosity, the higher the storage stability of the photosensitive composition. It is preferred that the change in viscosity be within the range of ±3%. When the viscosity change is too large, disadvantages are likely caused, such as the deterioration of the pattern shape and the lowering of the resolution.

EXAMPLE 1

As a tetracarboxylic acid dianhydride (TCD) mixture, a mixture of 22.5 g of pyromellitic dianhydride (PMDA), 72.0 g of 4,4'-oxydiphthalic dianhydride (ODPA) and 58.1 g of 3,3',4,4'-benzophenone tetracarboxylic dianhydride (BTDA) was used. In the TCD mixture used, the amount of group X represented by formula (II) (i.e., tetravalent benzene group (II)) was 20 mol %, and the amount of group X represented by formula (III) (i.e., tetravalent diphenyl ether group (III)) was 45 mol %, both based on the total molar amount of X groups in the recurring units represented by formula (I) above. The TCD mixture was placed in a 2 liter separable flask and 136.8 g of 2-hydroxymethyl methacrylate (HEMA) and 400 ml of γ-butyrolactone were added thereto, followed by agitation at room temperature, thereby obtaining a mixture. To the thus obtained mixture was added 81.5 g of pyridine while agitating, to thereby obtain a reaction mixture. After the termination of heat generation caused by the reaction, the obtained reaction mixture was allowed to cool to room temperature and then, allowed to stand for 16 hours. To the resultant mixture was added a solution obtained by dissolving 210.4 g of dicyclohexylcarbodiimide (DCC) in 180 ml of γ-butyrolactone, while agitating and cooling with ice, over a period of 40 minutes, and subsequently, to the resultant was added a suspension prepared by suspending 96.4 g of 4,4'-diaminodiphenyl ether (DADPE) (used as a diamine (DA)) in 350 ml of γ-butyrolactone, while agitating, over a period of 60 minutes, to thereby obtain a mixture. The mixture was agitated at room temperature for 2 hours. To the mixture was added 30 ml of ethyl alcohol, followed by agitation for 1 hour. Thereto was added 400 ml of γ-butyrolactone, to thereby obtain a mixture containing a precipitate. The precipitate in the mixture was filtered off, thereby obtaining a solution. The solution was added to 3 liters of ethyl alcohol to form a precipitate of a crude polymer. The precipitate was recovered by filtration and dissolved in 1.5 liters of tetrahydrofuran to thereby obtain a crude polymer solution. The crude polymer solution was dropwise added to 28 liters of water to precipitate the polymer. The precipitated polymer was recovered by filtration and vacuum-dried, thereby obtaining a powdery polymer (polyamide ester). The number average molecular weight of the obtained polyamide ester was determined by gel permeation chromatography (using a calibration curve obtained with respect to standard polystyrene samples) and found to be 21,000.

The types and amounts of TCD's used, the amount of HEMA used, the amount of DCC used, the type and amount of DA used, and the number average molecular weight of the obtained polymer are shown in Table 1.

A photosensitive composition was prepared as follows using the obtained polymer, and the properties of the prepared photosensitive composition were determined and evaluated.

100 g of the obtained polymer (a polyamide ester which is component (A) of the photosensitive composition) was dissolved in approximately 150 g of NMP (a solvent which is component (C) of the photosensitive composition) together with 4 g of diphenylpropanetrione-2-(o-ethoxycarbonyl)oxime (a photopolymerization initiator which is component (B) of the photosensitive composition), 4 g of tetraethylene glycol dimethacrylate, 2 g of 1-phenyl-5-mercaptotetrazole, 4 g of N-phenyldiethanolamine, 3 g of N-[3-(triethoxysilyl)propyl]phthalamidic acid and 0.02 g of 2-nitroso-1-naphthol, thereby obtaining a solution. The viscosity of the obtained solution was adjusted to 40 poises by adding a small amount of NMP, and the resultant solution was used as a photosensitive composition.

With respect to the obtained photosensitive composition, the change in viscosity and the resolution are shown in Table 1, together with the residual stress, elongation, precision in the polyimide pattern, chemical resistance and water resistant adhesion with respect to the polyimide pattern coating obtained from the photosensitive composition.

In addition, by the analysis in accordance with the HBr decomposition method described in "Koubunshi Bunseki Kenkyu Konshinkai, Dai-221-kai Shiryo (Reference Materials for the 221st Meeting on the Researches of Polymer Analysis)", 1986, (Sakuma), it was confirmed that the molar ratio of PMDA to ODPA used as the raw materials was the same as the molar ratio of group X represented by formula (II) (i.e., tetravalent benzene group (II) in the obtained polymer) to group X represented by formula (III) (i.e., tetravalent diphenyl ether group (III) in the obtained polymer).

EXAMPLES 2 THROUGH 14

A powdery polymer was produced in the same manner as in Example 1, except that the types and the amounts of TCD's, the amount of HEMA, the amount of DCC, and the type and the amount of DA are changed as shown in Table 1.

Then, a photosensitive composition was produced in the same manner as in Example 1, except that the polymer obtained above was used. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 1.

EXAMPLE 15

As a tetracarboxylic acid dianhydride (TCD) mixture, a mixture of 56.2 g of pyromellitic dianhydride (PMDA) and 80.0 g of 4,4'-oxydiphthalic dianhydride (ODPA) was used. In the TCD mixture used, the amount of group X represented by formula (II) (i.e., tetravalent benzene group (II)) was 50 mol %, and the amount of group X represented by formula (III) (i.e., tetravalent diphenyl ether group (III)) was 50 mol %, both based on the total molar amount of groups X in the recurring units represented by formula (I) above. The TCD mixture was placed in a 2 liter separable flask and 134.1 g of 2-hydroxymethyl methacrylate (HEMA) and 400 ml of γ-butyrolactone were added thereto, followed by agitation at room temperature, thereby obtaining a mixture. To the thus obtained mixture was added 73.3 g of pyridine while agitating, to thereby obtain a reaction mixture. After the termination of heat generation caused by the reaction, the obtained reaction mixture was allowed to cool to room temperature and then, allowed to stand for 16 hours. Then, 128.9 g of thionyl chloride was added to the reaction mixture at 10° C. or less over 30 minutes and then, the mixture was allowed to stand at 15° C. for 1 hour. To the resultant mixture was added a solution obtained by dissolving 99.5 g of 2,2'-dimethyl-4,4'-diaminobiphenyl (MTB) in 350 ml of γ-butyrolactone, while agitating and cooling with ice, over a period of 30 minutes. Then, the mixture was agitated at room temperature for 16 hours. To the resultant mixture was added 30 ml of ethyl alcohol, followed by agitation for 1 hour. The resultant solution was added to 10 liters of water to form a precipitate of a crude polymer. The precipitate was recovered by filtration and dissolved in 1.0 liter of tetrahydrofuran to thereby obtain a crude polymer solution. The obtained crude polymer solution was subjected to purification using an anion exchange resin (Amberlist®15, manufactured and sold by Organo Corporation, Japan) to obtain a polymer solution. The obtained polymer solution was dropwise added to 8 liters of water to precipitate the polymer. The precipitated polymer was recovered by filtration and vacuum-dried, thereby obtaining a powdery polymer (polyamide ester).

Then, a photosensitive composition was produced in the same manner as in Example 1, except that the polymer obtained above was used. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 1.

TABLE 1

| Ex. | TCD Type | Amount (g) | Ratio of group (II) or (III) to the total amount of X groups in the recurring units (mol %) (II) | Ratio (III) | HEMA (g) (equivalent)*1 | DCC (g) (equivalent)*1 | DA Type | DA Amount (g) | Number average molecular weight | Residual stress (MPa) | Elongation (%) | Resolution (μm) | Precision in polyimide pattern | Chemical resistance | Water resistant adhesion | Change in viscosity (%) |
|---|---|---|---|---|---|---|---|---|---|---|---|---|---|---|---|---|
| 1 | PMDA ODPA BTDA | 22.5 72.0 58.1 | 20 | 45 | 136.8 (1.02) | 210.4 (0.99) | DADPE | 96.4 | 21000 | 31 | 70 | 4 | Good | Good | Good | −0.9 |
| 2 | PMDA ODPA | 61.8 72.0 | 55 | 45 | 136.8 (1.02) | 210.4 (0.99) | DADPE | 96.4 | 22000 | 27 | 40 | 4 | Good | Good | Good | −0.3 |
| 3 | PMDA ODPA | 56.2 80.0 | 50 | 50 | 136.8 (1.02) | 210.4 (0.99) | MTB | 99.5 | 25000 | 23 | 35 | 4 | Good | Good | Good | −0.8 |
| 4 | PMDA ODPA BTDA | 78.7 40.0 8.3 | 70 | 25 | 134.1 (1.04) | 212.5 (0.98) | BAPB | 176.5 | 22000 | 30 | 50 | 4 | Good | Good | Good | −1.3 |
| 5 | PMDA ODPA | 61.8 72.0 | 55 | 45 | 139.5 (1.04) | 208.4 (0.98) | MTB | 101.1 | 25000 | 22 | 36 | 4 | GOod | Good | Good | −0.8 |
| 6 | PMDA ODPA | 78.6 47.9 | 70 | 30 | 139.4 (1.04) | 208.2 (0.98) | DADPE | 95.1 | 21000 | 26 | 38 | 4 | Good | Good | Good | −0.2 |
| 7 | PMDA ODPA | 78.6 47.9 | 70 | 30 | 139.4 (1.04) | 208.2 (0.98) | MTB | 100.9 | 23000 | 20 | 38 | 4 | Good | Good | Good | −0.2 |
| 8 | PMDA ODPA BTDA | 22.5 72.0 58.1 | 20 | 45 | 134.0 (1.00) | 212.5 (1.00) | DADPE | 96.4 | 22000 | 32 | 68 | 5 | Good | Good | Good | −3.2 |
| 9 | PMDA ODPA | 61.8 72.0 | 55 | 45 | 134.0 (1.00) | 212.5 (1.00) | DADPE | 96.4 | 23000 | 27 | 40 | 5 | Good | Good | Good | −2.9 |
| 10 | PMDA ODPA | 56.2 80.0 | 50 | 50 | 134.3 (1.00) | 212.9 (1.00) | MTB | 99.5 | 24500 | 23 | 33 | 5 | Good | Good | Good | −3.2 |
| 11 | PMDA ODPA BTDA | 78.7 40.0 8.3 | 70 | 25 | 134.3 (1.00) | 212.9 (1.00) | BAPB | 176.5 | 23000 | 30 | 45 | 5 | Good | Good | Good | −2.3 |
| 12 | PMDA ODPA | 61.8 72.0 | 55 | 45 | 134.0 (1.00) | 212.5 (1.00) | MTB | 101.1 | 25500 | 22 | 35 | 5 | Good | Good | Good | −1.4 |
| 13 | PMDA ODPA | 78.6 47.9 | 70 | 30 | 133.8 (1.00) | 212.1 (1.00) | DADPE | 95.1 | 22000 | 26 | 36 | 5 | Good | Good | Good | −1.2 |

TABLE 1-continued

| Ex. | TCD Type | Amount (g) | Ratio (II) (mol %) | Ratio (III) (mol %) | HEMA (g) (equivalent)*1) | DCC (g) (equivalent)*1) | DA Type | DA Amount (g) | Number average molecular weight | Residual stress (MPa) | Elongation (%) | Resolution (μm) | Precision in polyimide pattern | Chemical resistance | Water resistant adhesion | Change in viscosity (%) |
|---|---|---|---|---|---|---|---|---|---|---|---|---|---|---|---|---|
| 14 | PMDA<br>ODPA | 78.6<br>47.9 | 70 | 30 | 134.2 (1.00) | 212.8 (1.00) | MTB | 100.9 | 23000 | 20 | 35 | 5 | Good | Good | Good | −0.9 |
| 15 | PMDA<br>ODPA | 56.2<br>80.0 | 50 | 50 | 134.1 (1.00) | *2) | MTB | 99.5 | 21000 | 27 | 30 | 3 | Good | Good | Good | −2.8 |

Notes:
TCD: Tetracarboxylic acid dianhydride
ODPA: 4,4′-oxydiphthalic dianhydride
TDA: 3,3′,4,4′-benzophenone tetracarboxylic dianhydride
PMDA: Pyromellitic dianhydride
HEMA: 2-hydroxyethyl methacrylate
DCC: Dicyclohexyl carbodiimide
DA: Diamine
DADPE: 4,4′-diaminodiphenyl ether
BAPB: 4,4′-bis(4-aminophenoxy)biphenyl
MTB: 2,2′-dimethyl-4,4′-diaminobiphenyl
*1)Equivalent per equivalent of a tetracarboxylic acid dianhydride
*2): 208.2 g of SOCl$_2$ and 73.3 g of pyridine (0.435 equivalent per equivalent of an acid by-produced during the condensation polymerization reaction) were added.

Comparative Examples 1 through 12

A powdery polymer was produced in the same manner as in Example 1, except that the type and the amount of TCD, the amount of HEMA, the amount of DCC, and the type and the amount of DA were changed as shown in Table 2.

Then, a photosensitive composition was produced in the same manner as in Example 1, except that the polymer obtained above was used. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 2.

Comparative Example 13

95.8 g of DADPE was dissolved in 1.2 liters of NMP (solvent), while stirring. To the resultant solution was added 159.9 g of ODPA and the resultant mixture was agitated at 40° C. for 8 hours to obtain a solution of a polyamide ester. To the obtained polyamide ester solution was added 30 ml of ethyl alcohol, followed by agitation for 1 hour. Thereto was added 400 ml of NMP, to thereby obtain a mixture containing a precipitate. The precipitate in the mixture was filtered off, thereby obtaining a solution. The solution was added to 3 liters of ethyl alcohol to form a precipitate of a crude polymer. The precipitate was recovered by filtration and dissolved in 1.5 liters of dimethylformamide to thereby obtain a crude polymer solution. The crude polymer solution was dropwise added to 28 liters of water to precipitate the polymer. The precipitated polymer was recovered by filtration and vacuum-dried, thereby obtaining a powdery polymer.

Then, a photosensitive composition was produced in the same manner as in Example 1, except that the polymer obtained above was used. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 2.

Comparative Examples 14 through 18

A powdery polymer was produced in the same manner as in Comparative Example 13, except that the types and the amounts of TCDs and the type and the amount of DA were changed as shown in Table 2.

Then, a photosensitive composition was produced in the same manner as in Example 1, except that the polymer obtained above was used. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 2.

TABLE 2

| Comp. Ex. | Type | Amount (g) | TCD Ratio of group (II) or (III) to the total amount of X groups in the recurring units (mol %) (II) | (III) | HEMA (g) (equivalent)*1 | DCC (g) (equivalent)*1 | DA Type | DA Amount (g) | Number average molecular weight | Residual stress (MPa) | Elongation (%) | Resolution (μm) | Precision in polyimide pattern | Chemical resistance | Water resistant adhesion | Change in viscosity (%) |
|---|---|---|---|---|---|---|---|---|---|---|---|---|---|---|---|---|
| 1 | ODPA | 159.9 | 0 | 100 | 138.8 (1.00) | 208.4 (1.02) | DADPE | 95.8 | 23000 | 33 | 70 | 6 | Poor (Pattern shape changed during the curing process.) | Poor (The thickness of the coating decreased.) | Good | −7.2 |
| 2 | BTDA PMDA | 116.3 33.7 | 30 | 0 | 134.1 (1.00) | 216.7 (1.02) | DADPE | 96.4 | 22000 | 45 | 15 | 6 | Good | Good | Good | 2.1 |
| 3 | PMDA | 112.4 | 100 | 0 | 134.1 (1.00) | 216.7 (1.02) | DADPE | 96.4 | 25000 | 35 | 15 | 6 | Good | Good | Poor | 2.5 |
| 4 | PMDA | 112.4 | 100 | 0 | 134.1 (1.00) | 214.6 (1.01) | BAPS | 207.2 | 21000 | 30 | 15 | 6 | Good | Good | Poor | 1.9 |
| 5 | BTDA | 166.1 | 0 | 0 | 134.1 (1.00) | 214.6 (1.01) | BAPB | 176.5 | 24000 | 38 | 70 | 13 | Poor (insufficient resolution) | Poor | Good | 5.3 |
| 6 | ODPA | 159.9 | 0 | 100 | 139.5 (1.00) | 208.4 (0.98) | MTB | 99.5 | 24000 | 45 | 50 | 5 | Good | Poor | Good | −6.3 |
| 7 | PMDA ODPA | 33.6 111.7 | 30 | 70 | 139.1 (1.04) | 207.9 (0.98) | DADPE | 95.0 | 26000 | 34 | 53 | 5 | Good | Poor | Good | −4.2 |
| 8 | PMDA ODPA | 95.4 23.9 | 85 | 15 | 139.1 (1.04) | 207.9 (0.98) | DADPE | 95.0 | 23000 | 31 | 28 | 5 | Good | Good | Poor | 1.1 |
| 9 | PMDA ODPA | 33.6 111.7 | 30 | 70 | 139.1 (1.04) | 207.9 (0.98) | MTB | 100.7 | 24000 | 32 | 45 | 8 | Good | Good | Poor | −2.1 |
| 10 | PMDA ODPA | 95.4 23.9 | 85 | 15 | 139.1 (1.04) | 207.9 (0.98) | MTB | 100.7 | 25000 | 12 | 20 | 8 | Poor | Good | Poor | 1.0 |
| 11 | PMDA | 112.2 | 100 | 0 | 139.2 (1.04) | 208.0 (0.98) | MTB | 100.8 | 22000 | 5 | 15 | 8 | Poor | Good | Poor | 2.1 |
| 12 | PMDA ODPA | 56.2 80.0 | 50 | 50 | 134.1 (1.00) | 216.7 (1.02) | DADPE | 95.0 | 23000 | 34 | 45 | 5 | Good | Poor | Good | −3.1 |
| 13 | ODPA | 159.9 | 0 | 100 | — | — | DADPE | 95.8 | — | 33 | 55 | — | — | Poor | Good | −15.2 |
| 14 | PMDA ODPA | 22.5 127.8 | 20 | 80 | — | — | DADPE | 95.8 | — | 34 | 42 | — | — | Poor | Good | −13.1 |

TABLE 2-continued

| Comp. Ex. | TCD Type | Amount (g) | Ratio of group (II) or (III) to the total amount of X groups in the recurring units (mol %) (II) | Ratio of group (II) or (III) to the total amount of X groups in the recurring units (mol %) (III) | HEMA (g) (equivalent)*1 | DCC (g) (equivalent)*1 | DA Type | DA Amount (g) | Number average molecular weight | Residual stress (MPa) | Elongation (%) | Resolution (μm) | Precision in polyimide pattern | Chemical resistance | Water resistant adhesion | Change in viscosity (%) |
|---|---|---|---|---|---|---|---|---|---|---|---|---|---|---|---|---|
| 15 | PMDA<br>ODPA | 44.9<br>95.9 | 40 | 60 | — | — | DADPE | 95.8 | — | 34 | 31 | — | — | Poor | Poor | −8.0 |
| 16 | PMDA<br>ODPA | 67.4<br>63.9 | 60 | 40 | — | — | DADPE | 95.8 | — | 35 | 20 | — | — | Good | Poor | −4.3 |
| 17 | PMDA<br>ODPA | 89.9<br>32.0 | 80 | 20 | — | — | DADPE | 95.8 | — | 35 | 15 | — | — | Good | Poor | 2.1 |
| 18 | PMDA | 112.3 | 100 | 0 | — | — | DADPE | 95.8 | — | 35 | 13 | — | — | Good | Poor | 3.1 |

Notes:
TCD: Tetracarboxylic acid dianhydride
ODPA: 4,4'-oxydiphthalic dianhydride
BTDA: 3,3',4,4'-benzophenone tetracarboxylic dianhydride
PMDA: Pyromellitic dianhydride
HEMA: 2-hydroxyethyl methacrylate
DCC: Dicyclohexyl carbodiimide
DA: Diamines
DADPE: 4,4'-diaminodiphenyl ether
BAPS: 4,4'-bis(4-aminophenoxy)diphenyl sulfone
BAPB: 4,4'-bis(4-aminophenoxy)biphenyl
MTB: 2,2'-dimethyl-4,4'-diaminobiphenyl
*1) Equivalent per equivalent of a tetracarboxylic acid dianhydride

Examples 16 through 18

A photosensitive composition was produced in the same manner as in Example 1, except that the polymers obtained in Comparative Examples were used in combination as shown in Table 3. With respect to the obtained photosensitive composition, the change in viscosity and the resolution are measured. Further, with respect to the polyimide pattern coating obtained from the photosensitive composition, the residual stress, elongation, precision in the polyimide pattern, chemical resistance, and water resistant adhesion were measured. The results are shown in Table 3.

TABLE 3

| Ex. | Comp. Ex. in which the polymers used have been produced | Amount (g) | Ratio of group (II) or (III) to the total amount of X groups in the recurring units (mol %) (II) | Ratio of group (II) or (III) to the total amount of X groups in the recurring units (mol %) (III) | Residual stress (MPa) | Elongation (g) | Resolution (µm) |
|---|---|---|---|---|---|---|---|
| 16 | Comp. Ex. 1 | 45 | 17 | 44 | 32 | 50 | 4 |
|    | Comp. Ex. 2 | 55 |    |    |    |    |   |
| 17 | Comp. Ex. 3 | 60 | 60 | 40 | 28 | 40 | 5 |
|    | Comp. Ex. 6 | 40 |    |    |    |    |   |
| 18 | Comp. Ex. 6 | 35 | 19 | 37 | 28 | 50 | 5 |
|    | Comp. Ex. 2 | 65 |    |    |    |    |   |

| Ex. | Precision in polyimide pattern | Chemical resistance | Water resistant adhesion | Change in viscosity (%) |
|---|---|---|---|---|
| 16 | Good | Good | Good | −2.5 |
| 17 | Good | Good | Good | −2.2 |
| 18 | Good | Good | Good | −1.6 |

Reference Example 1

The polymers obtained in Examples 1 to 7 and 15 to 18 and the Comparative Examples were individually formulated into polyimide tapes in the same manner as in the production of the polyimide tape used in the evaluation of elongation. The obtained tapes were individually subjected to a thermal mechanical analysis. Specifically, with respect to each of the polyimide tapes, an inflection point (glass transition temperature) was measured by means of a TMA measurement apparatus (TMA-50, manufactured and sold by Shimadzu Corp., Japan) under the conditions wherein the length of the sample was 10 mm, the cross section of the sample was 0.03105 mm², the flow rate of gas was 50.00 ml/min, the rate of temperature elevation was 10° C./min, the load was 200 g/mm², and the atmosphere was a nitrogen atmosphere. The results are shown in Table 4.

With respect to the polyimide tape produced from the polymer obtained in Example 3, the results of the TMA analysis are shown in FIG. 1 (wherein the analysis was repeated twice in order to confirm the reproducibility of the analysis).

TABLE 4

| Polymer | 1st glass transition temperature (° C.) | 2nd glass transition temperature (° C.) |
|---|---|---|
| Example 1 | 270 | 350 |
| Example 2 | 260 | 360 |
| Example 3 | 260 | 370 |
| Example 4 | 240 | 350 |

TABLE 4-continued

| Polymer | 1st glass transition temperature (° C.) | 2nd glass transition temperature (° C.) |
|---|---|---|
| Example 5 | 270 | 350 |
| Example 6 | 260 | 340 |
| Example 7 | 280 | 360 |
| Example 15 | 250 | 360 |
| Example 16 | 270 | 340 |
| Example 17 | 280 | 350 |
| Example 18 | 260 | 380 |
| Comparative Example 1 | 240 | None |
| Comparative Example 2 | 350 | None |
| Comparative Example 3 | 380 | None |
| Comparative Example 4 | 380 | None |
| Comparative Example 5 | 270 | None |
| Comparative Example 6 | 280 | None |
| Comparative Example 7 | 265 | None |
| Comparative Example 8 | 350 | None |
| Comparative Example 9 | 270 | None |
| Comparative Example 10 | 320 | None |
| Comparative Example 11 | 380 | None |
| Comparative Example 13 | 260 | None |
| Comparative Example 14 | 270 | None |
| Comparative Example 15 | 295 | None |
| Comparative Example 16 | 310 | None |
| Comparative Example 17 | 345 | None |
| Comparative Example 18 | 380 | None |

INDUSTRIAL APPLICABILITY

By the use of the polyamide ester of the present invention, it has become possible to prepare a photosensitive composition having excellent storage stability. Further, the use of such a photosensitive composition enables not only the formation of a polyimide coating which simultaneously exhibits a low residual stress, a high elongation, a high chemical resistance, a high heat resistance and a high adhesiveness to a substrate, but also the formation of a polyimide pattern with a high resolution and a high precision. Therefore, the polyamide ester of the present invention can be advantageously used in the production of electric or electronic parts, such as a semiconductor device and a multilayer circuit board. Further, the present invention is also concerned with a polyamide ester composition having the same excellent effects as mentioned above in connection with the polyamide ester of the present invention.

What is claimed is:

1. A polyamide ester comprising recurring units represented by the following formula (I):

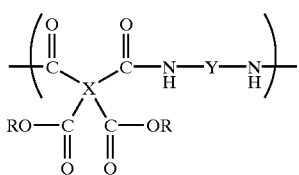

wherein:
each X independently represents a tetravalent aromatic group having 6 to 32 carbon atoms,
each Y independently represents a divalent organic group having 4 to 30 carbon atoms, and
each R independently represents a monovalent group containing an olefinic double bond,
said tetravalent aromatic groups X comprising:
15 to 70 mole %, based on the total molar amount of said tetravalent aromatic groups X, of a tetravalent benzene group (II) represented by the following formula (II):

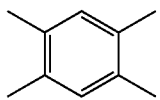, and 15 to 50 mole %, based on the total molar amount of said tetravalent aromatic groups X, of a tetravalent diphenyl ether group (III) represented by the following formula (III):

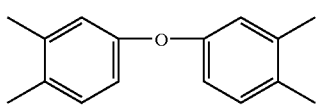, with the proviso that the total amount of said tetravalent benzene group (II) and said tetravalent diphenyl ether group (III) is at least 50 mole %, based on the total molar amount of said tetravalent aromatic groups X,
said polyamide ester being adapted to be converted to a polyimide in a coating form when a solution of said polyamide ester in a solvent for said polyamide ester is applied onto a silicon substrate to form a polyamide ester coating and heated at 350° C. for 2 hours in a nitrogen atmosphere, said polyimide coating exhibiting a residual stress of 33 MPa or less as measured with respect to a 10 μm-thick polyimide coating formed on said silicon substrate.

2. The polyamide ester according to claim 1, wherein the amount of said tetravalent diphenyl ether group (III) is 30 to 45 mole %, based on the total molar amount of said tetravalent aromatic groups X.

3. The polyamide ester according to claim 1 or 2, which is produced by a process comprising subjecting a tetracarboxylic acid diester dioxychloride mixture and a diamine to a condensation polymerization reaction in the presence of a basic compound, wherein said basic compound is used in an amount of not more than 0.5 equivalent per equivalent of acid by-produced during said condensation polymerization reaction, said tetracarboxylic acid diester dioxychloride mixture comprising a plurality of different tetracarboxylic acid diester dioxychlorides, each independently represented by the following formula (I'):

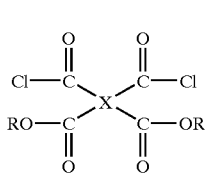

wherein:
X represents a tetravalent aromatic group having 6 to 32 carbon atoms,
R represents a monovalent group containing an olefinic double bond, and
Cl represents a chlorine atom,
said plurality of different tetracarboxylic acid diester dioxychlorides comprising:
15 to 70 mole %, based on the total molar amount of said plurality of different tetracarboxylic acid diester dioxychlorides, of a tetracarboxylic acid diester dioxychloride represented by said formula (I') wherein said tetravalent aromatic group X is a tetravalent benzene group (II) represented by the following formula (II):

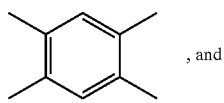, and 15 to 50 mole %, based on the total molar amount of said plurality of different tetracarboxylic acid diester dioxychlorides, of a tetracarboxylic acid diester dioxychloride represented by formula (I') wherein said tetravalent aromatic group X is a tetravalent diphenyl ether group (III) represented by the following formula (III):

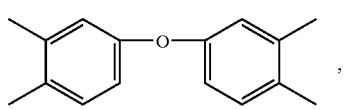, with the proviso that the total amount of said tetracarboxylic acid diester dioxychloride containing said tetravalent benzene group (II) and said tetracarboxylic acid diester dioxychloride containing said tetravalent diphenyl ether group (III) is at least 50 mole %, based on the total molar amount of said plurality of different tetracarboxylic acid diester dioxychlorides.

4. The polyamide ester according to claim 1 or 2, which is produced by a process comprising subjecting a tetracarboxylic acid diester mixture and a diamine to a condensation polymerization reaction in the presence of an organic dehydrating agent, said tetracarboxylic acid diester mixture comprising a plurality of different tetracarboxylic acid diesters, each independently represented by the following formula (I"):

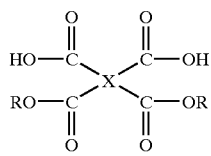

(I")

wherein:
X represents a tetravalent aromatic group having 6 to 32 carbon atoms; and
R represents a monovalent group containing an olefinic double bond, said plurality of different tetracarboxylic acid diesters comprising:
15 to 70 mole %, based on the total molar amount of said plurality of different tetracarboxylic acid diesters, of a tetracarboxylic acid diester represented by said formula (I") wherein said tetravalent aromatic group X is a tetravalent benzene group (II) represented by the following formula (II):

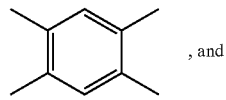

, and (II)

15 to 50 mole %, based on the total molar amount of said plurality of different tetracarboxylic acid diesters, of a tetracarboxylic acid diester represented by said formula (I") wherein said tetravalent aromatic group X is a tetravalent diphenyl ether group (III) represented by the following formula (III):

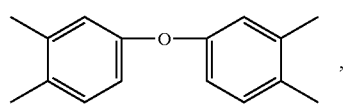

(III)

with the proviso that the total amount of said tetracarboxylic acid diester containing said tetravalent benzene group (II) and said tetracarboxylic acid diester containing said tetravalent diphenyl ether group (III) is at least 50 mole %, based on the total molar amount of said plurality of different tetracarboxylic acid diesters.

5. The polyamide ester according to claim 4, wherein said tetracarboxylic acid diester mixture is produced by reacting a mixture of different tetracarboxylic acid dianhydrides having tetravalent aromatic groups X corresponding to the tetravalent aromatic groups X of said plurality of different tetracarboxylic acid diesters with an alcohol, wherein said alcohol is used in an amount of 1.01 to 1.10 equivalents per equivalent of said mixture of different tetracarboxylic acid dianhydrides.

6. The polyamide ester according to claim 4, wherein said organic dehydrating agent is used in an amount of 0.90 to 0.99 equivalent per equivalent of said tetracarboxylic acid diester mixture.

7. A polyamide ester composition comprising a plurality of different polyamide esters, each independently comprising recurring units represented by the following formula (I):

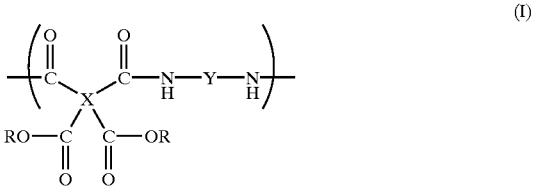

(I)

wherein:
each X independently represents a tetravalent aromatic group having 6 to 32 carbon atoms,
each Y independently represents a divalent organic group having 4 to 30 carbon atoms, and
each R independently represents a monovalent group containing an olefinic double bond, said plurality of different polyamide esters collectively containing, as said tetravalent aromatic groups X, the following two types of groups:
15 to 70 mole %, based on the total molar amount of said tetravalent aromatic groups X, of a tetravalent benzene group (II) represented by the following formula (II):

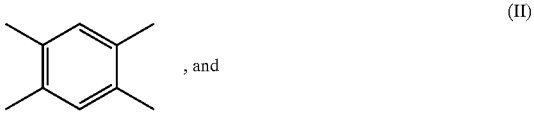

, and (II)

15 to 50 mole %, based on the total molar amount of said tetravalent aromatic groups X, of a tetravalent diphenyl ether group (III) represented by the following formula (III):

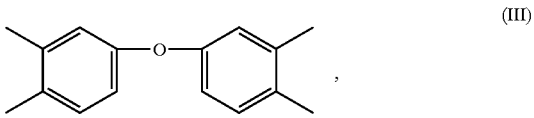

(III)

with the proviso that the total amount of said tetravalent benzene group (II) and said tetravalent diphenyl ether group (III) is at least 50 mole %, based on the total molar amount of said tetravalent aromatic groups X, said polyamide ester composition being adapted to be converted to a polyimide composition in a coating form when a solution of said polyamide ester composition in a solvent for said polyamide ester composition is applied onto a silicon substrate to form a polyamide ester composition coating and heated at 350° C. for 2 hours in a nitrogen atmosphere, said polyimide composition coating exhibiting a residual stress of 33 MPa or less as measured with respect to a 10 $\mu$m-thick polyimide composition coating formed on said silicon substrate.

8. The polyamide ester composition according to claim 7, wherein the amount of said tetravalent diphenyl ether group (III) is 30 to 45 mole %, based on the total molar amount of said tetravalent aromatic groups X.

9. The polyamide ester composition according to claim 7 or 8, wherein said plurality of different polyamide esters are individually produced by subjecting a plurality of different tetracarboxylic acid diesters individually or in combination to a condensation polymerization reaction with an amine in the presence of an organic dehydrating agent, wherein said plurality of different tetracarboxylic acid diesters have tetravalent aromatic groups X corresponding to the tetravalent aromatic groups X of said plurality of different polyamide esters and wherein said organic dehydrating agent is used in an amount of 0.90 to 0.99 equivalent per equivalent of each or the combination of said plurality of different tetracarboxylic acid diesters, said plurality of different tetracarboxylic acid diesters being individually, independently represented by the following formula (I″):

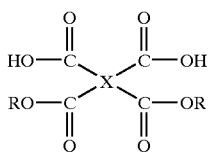

(I″)

wherein:
X represents a tetravalent aromatic group having 6 to 32 carbon atoms; and
R represents a monovalent group containing an olefinic double bond,
said plurality of different tetracarboxylic acid diesters comprising:
a tetracarboxylic acid diester represented by said formula (I″) wherein said tetravalent aromatic group X is a tetravalent benzene group (II) represented by the following formula (II):

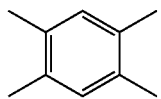

(II)

, and a tetracarboxylic acid diester represented by formula (I″) wherein said tetravalent aromatic group X is a tetravalent diphenyl ether group (III) represented by the following formula (III):

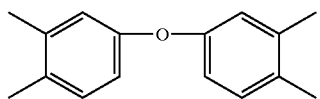

(III)

, said tetracarboxylic acid diester containing said tetravalent benzene group (II) and said tetracarboxylic acid diester containing said tetravalent diphenyl ether group (III) being used such that the amounts of said tetravalent benzene group (II) and said tetravalent diphenyl ether group (III) in said polyamide ester composition are, respectively, 15 to 70 mole % and 15 to 50 mole %, based on the total molar amount of tetravalent aromatic groups X present in said polyamide ester composition, and the total amount of said tetravalent benzene group (II) and said tetravalent diphenyl ether group (III) in said polyamide ester composition becomes at least 50 mole %, based on the total molar amount of said tetravalent aromatic groups X present in said polyamide ester composition.

10. The polyamide ester composition according to claim 9, wherein said plurality of different tetracarboxylic acid diesters are individually, independently obtained by individually reacting a plurality of different tetracarboxylic acid dianhydrides having tetravalent aromatic groups X corresponding to the X groups of said plurality of different tetracarboxylic acid diesters with an alcohol, wherein said alcohol is used in an amount of 1.01 to 1.10 equivalents per equivalent of each of said plurality of different tetracarboxylic acid dianhydrides.

11. A photosensitive composition comprising:
(A) the polyamide ester of claim 1 or 2, or the polyamide ester composition of claim 7 or 8,
(B) a photopolymerization initiator, and
(C) a solvent for components (A) and (B).

12. A method for forming a polyimide pattern on a substrate, comprising:
(i) providing a photosensitive composition comprising:
(A) the polyamide ester of claim 1 or 2, or the polyamide ester composition of claim 7 or 8,
(B) a photopolymerization initiator, and
(C) a solvent for components (A) and (B);
(ii) applying said photosensitive composition onto a substrate, followed by drying to thereby obtain a dried photosensitive composition coating formed on said substrate;
(iii) exposing said dried photosensitive composition coating to UV light through a photomask bearing a pattern, followed by treatment with a solvent for said dried photosensitive composition to remove unexposed portions of said dried photosensitive composition coating, thereby forming a polyamide ester pattern on said substrate; and
(iv) heating said polyamide ester pattern to imidize the polyamide ester present in said pattern, thereby obtaining a polyimide pattern formed on said substrate.

* * * * *